(12) United States Patent
Hiemer et al.

(10) Patent No.: US 12,188,497 B2
(45) Date of Patent: Jan. 7, 2025

(54) SYSTEM AND METHOD FOR CONTROLLING A HYDRAULIC SUPPLY SYSTEM ON A MOBILE MACHINE

(71) Applicant: AGCO International GmbH, Neuhausen (CH)

(72) Inventors: Martin Hiemer, Marktoberdorf (DE); Simon Walz, Marktoberdorf (DE); Thomas Harrer, Marktoberdorf (DE); Felix Janot, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/707,952

(22) PCT Filed: Nov. 15, 2022

(86) PCT No.: PCT/IB2022/060968
§ 371 (c)(1),
(2) Date: May 7, 2024

(87) PCT Pub. No.: WO2023/100001
PCT Pub. Date: Jun. 8, 2023

(65) Prior Publication Data
US 2024/0337279 A1    Oct. 10, 2024

(30) Foreign Application Priority Data
Dec. 3, 2021    (GB) ...................................... 2117524

(51) Int. Cl.
*F15B 21/08*    (2006.01)
*F15B 11/16*    (2006.01)
(Continued)

(52) U.S. Cl.
CPC .......... *F15B 21/085* (2013.01); *F15B 11/165* (2013.01); *F15B 19/00* (2013.01);
(Continued)

(58) Field of Classification Search
CPC .... F15B 11/165; F15B 21/082; F15B 21/087; F15B 2211/65; F15B 2211/6652; F15B 2211/6658
See application file for complete search history.

(56) References Cited

U.S. PATENT DOCUMENTS 5,129,230 A    7/1992    Izumi et al.
5,193,342 A    3/1993    Omberg et al.
(Continued)

FOREIGN PATENT DOCUMENTS

DE    102009020111 A1    11/2010
DE    102014103932 B3    7/2015
(Continued)

OTHER PUBLICATIONS

UK Intellectual Property Office, Search Report for related UK Application No. GB2117524.5, dated May 18, 2022, 4 pages.
(Continued)

*Primary Examiner* — Michael Leslie

(57) ABSTRACT

A system for controlling a hydraulic supply on a mobile machine comprises electronic load sensing and is configured to predictively increase the pump supply pressure PSP following a determination that a hydraulic consumer is about to be actuated. The pump supply is increased irrespective of the reported hydraulic load at the time to meet a predicted hydraulic demand of consumer. The control system may revert to a load-sensing-based control of the pump supply after a given time period or in dependence on a predefined operational parameter being met. A corresponding method of controlling a hydraulic system on a mobile machine is also disclosed.

18 Claims, 6 Drawing Sheets

(51) Int. Cl.
  *F15B 19/00* (2006.01)
  *A01B 76/00* (2006.01)

(52) U.S. Cl.
  CPC .......... *F15B 21/082* (2013.01); *F15B 21/087* (2013.01); *A01B 76/00* (2013.01); *F15B 2211/65* (2013.01); *F15B 2211/6652* (2013.01); *F15B 2211/6658* (2013.01)

(56) References Cited

U.S. PATENT DOCUMENTS

| | | | |
|---|---|---|---|
| 5,479,778 A | 1/1996 | Toyooka et al. | |
| 6,173,572 B1* | 1/2001 | Cobo | E02F 9/2203 60/327 |
| 6,308,516 B1* | 10/2001 | Kamada | F15B 11/167 60/452 |
| 6,651,428 B2 | 11/2003 | Takahashi et al. | |
| 8,596,052 B2 | 12/2013 | Vigholm et al. | |
| 9,200,431 B2 | 12/2015 | Mori et al. | |
| 9,784,368 B2* | 10/2017 | Matsuzaki | F15B 11/165 |
| 9,861,024 B2 | 1/2018 | Vogler et al. | |
| 10,329,739 B2 | 6/2019 | Hoshino et al. | |
| 10,575,454 B2 | 3/2020 | De Nale et al. | |
| 11,214,940 B2 | 1/2022 | Takahashi et al. | |
| 11,761,464 B2* | 9/2023 | Ziemens | F15B 11/165 60/327 |
| 2007/0151238 A1 | 7/2007 | Kraft | |
| 2009/0031719 A1 | 2/2009 | Tsuruga et al. | |
| 2010/0154400 A1 | 6/2010 | Krajnik et al. | |
| 2010/0154401 A1 | 6/2010 | Sullivan, Jr. et al. | |
| 2014/0165543 A1 | 6/2014 | Takebayashi et al. | |
| 2017/0325393 A1 | 11/2017 | Gschwendtner et al. | |
| 2019/0345694 A1 | 11/2019 | Schmuttermair et al. | |
| 2021/0025133 A1 | 1/2021 | Myers et al. | |
| 2021/0025138 A1 | 1/2021 | Muehlbauer et al. | |
| 2022/0030756 A1 | 2/2022 | Vennemann | |

FOREIGN PATENT DOCUMENTS

| | | |
|---|---|---|
| DE | 102016107187 A1 | 10/2017 |
| EP | 0796952 A1 | 9/1997 |
| EP | 1266563 A1 | 12/2002 |
| EP | 2878829 A1 | 6/2015 |
| EP | 2886926 A1 | 6/2015 |
| JP | H0874805 A | 3/1996 |
| JP | 2001074001 A | 3/2001 |
| JP | 2008151211 A | 7/2008 |
| JP | 2008180203 A | 8/2008 |
| JP | 2009074406 A | 4/2009 |
| JP | 2009299301 A | 12/2009 |

OTHER PUBLICATIONS

European Patent Office, International Search Report related to International Patent Application No. PCT/IB2022/060968, mail date Jan. 25, 2023, 15 pages.

Dipl.-Ing. Rudiger Freimann, Springe: ""Kapitel 1-4""Automation mobiler Arbeitsmaschinen—Gerat steuert Traktor"", Dec. 1, 2003 (Dec. 1, 2003), VDI-Verlag, Dusseldorf, XP055628781, pp. 1-150. Including translation of pp. 15, 68-70, 92. Including translation of pictures: 33, 35, 39. Including translation of tables: 11, 12.

* cited by examiner

SYSTEM AND METHOD FOR CONTROLLING A HYDRAULIC SUPPLY SYSTEM ON A MOBILE MACHINE

CROSS-REFERENCE TO RELATED APPLICATIONS

This application is a national phase entry under 35 U.S.C. § 371 of International Patent Application PCT/IB2022/060968, filed Nov. 15, 2022, designating the United States of America and published in English as International Patent Publication WO 2023/100001 A1 on Jun. 8, 2023, which claims the benefit of the filing date of U. K. Patent Application 2117524.5 "System and Method for Controlling a Mobile Agricultural Machine Having a Hydraulic Supply System," filed Dec. 3, 2021, the entire disclosure of which is incorporated herein by reference.

FIELD

The disclosure relates to a control system for controlling a pressurized fluid supply system on a mobile machine. The control system is particularly applicable for use with a pressurized fluid supply system on a mobile agricultural machine, such as a tractor, which is capable of supplying pressurized fluid to consumers on the machine and to consumers on an agricultural implement attached to the machine. The disclosure also relates to a mobile machine, or to a combination of a mobile machine and attached implement, having such a control system, and to a method of controlling a pressurized fluid supply system on a mobile machine or on a mobile machine and attached implement combination.

BACKGROUND

Pressurized fluid (hydraulic) supply systems are widely used to drive consumers on agricultural or construction mobile machines, e.g. a tractor or a self-propelled harvester, or on implements attached thereto. Such mobile machines will be referred to hereinafter simply as machines and are sometimes referred to as vehicles. These hydraulic systems are mostly provided with a pump supply, consumers, control means (respectively control valves) and a tank to provide a fluid reservoir. The term "consumer" is used in the further description to encompass hydraulic drives such as rotary motors or linear rams but also for the respective control valves assigned to these drives. The term "control" in relation to supply systems hereby includes any adjustment of the supply system regarding direction, supply time or pressure of the fluid flow or the delivery of the pump used to supply the system. The term "pump supply" includes the pump and all valve means which are needed to adjust the fluid flow and/or fluid pressure supplied by the pump to a pump supply line. The pressure of the fluid provided by the pump supply being referred to herein as the pump supply pressure PSP.

In a hydrostatic hydraulic system, a pressure differential is needed to provide hydrostatic work (an output). This pressure differential between the pump supply (source) and consumer results in a fluid flow which is sufficient to undertake work, such as to lift a tractor three-point hitch or a operate a rotary drive on an implement or in a hydrostatic drive for example. Furthermore, a stand-by or static pressure differential $\Delta P_{st}$ is also needed when the system is otherwise in idle mode to keep control valves (assigned to consumers) responsive so that the spool of the valve can be moved on demand.

Hydraulic losses are present whenever oil circulates within a hydraulic system even when no consumer is operated. To mitigate this problem, it is known to provide means to forward a demand of a consumer to the pump supply. These systems are generally called load sensing systems (the term load sensing is abbreviated to LS). In such systems, a load induced pressure demand of the consumers, hereafter referred to as a "load sensing pressure" LSP, is hydraulically fed back to the pump supply via pipes or hoses so that pump supply oil flow/pressure can be adjusted according to the needs of the consumers. This load sensing pressure LSP feedback signal is typically generated by the control valve assigned to a consumer and the highest load sensing pressure LSP of all the consumers supplied by the pump is used to adjust the pump supply.

In general, there are two different types of hydraulic supply systems with LS demand feedback available on the market-closed-center load sensing systems (CC-LS systems) and open-center load sensing systems (OC-LS systems).

CC-LS systems are equipped with variable displacement pumps whereby the demand of the consumers is hydraulically fed back to the pump supply including an adjustment means for the pump so that the displacement of the pump is adjusted according to the needs of the consumers.

To ensure that a stand-by pressure differential $\Delta Pst$ is maintained in the supply to support fast system response, the pump is kept on low displacement to compensate for losses/leakage resulting in a stand-by pressure even if there is no demand by consumers. As a result of the reduction of the hydraulic fluid circulation, losses and power input required by the pump are reduced.

FIG. 1 illustrates part of a simplified known CC-LS hydraulic circuit. A pump supply 10 includes a variable displacement pump 12 which draws fluid from a tank 14 and forwards pressurized fluid to consumers (not shown) via a pump supply line P. Fluid is returned to the tank from the consumers via a return or tank line T. The pump 12 can be any suitable variable displacement pump and could, for example, be a swash plate axial piston pump in which the displacement of the pump is changed by pivoting the swash plate by means of a pump actuator 16 to vary the piston stoke. In the arrangement illustrated, actuator 16 is biased by a spring to pivot the swash plate in a direction to increase pump displacement and hence the output of the pump. Pressurized fluid introduced into a chamber 20 of the actuator opposes the force of the spring and if the force of the fluid is greater than that of the spring the swash plate is pivoted to reduce the delivery of the pump.

Operation of the actuator 16 is controlled by a flow control valve 22 and a pressure limiting valve 24, which together with the actuator 16 form a pump controller and form part of the pump supply 10. Each of the valves is biased by a respective spring 26, 28 to the position shown in which the actuator chamber 20 is connected to the tank 14. Each of the valves has a pump pressure port 30, 32 connected to the pressure line P of pump so that the fluid pressure acting on the valve spool through the pump pressure port 30, 32 opposes the force of the respective spring 26, 28. The flow control valve 22 also has a LS pressure port 34 to which a load sensing pressure signal line LS is connected. The highest consumer load sensing pressure LSP of the various consumers in the hydraulic LS system is fed into the LS pressure signal line so that the load sensing pressure LSP is added to the force of the spring to move the valve spool towards the position shown. The spring 26 in the flow control valve sets the stand-by pressure differential ΔPst which is typically in the region of 10 to 30 bar for tractor applications. The spring force may be adjustable to enable the stand-by pressure differential ΔPst to be adjusted. The spring 28 of the pressure limiting valve sets the maximum operating pressure of the system, which could be in the region 250 bar in the present example. Again, the spring force may be adjustable to enable the maximum operating pressure to be adjusted.

In normal operation when the system is at idle with no demand from the consumers, the pump supply pressure PSP acting through the pump pressure port 30 of the flow control valve 22 moves the spool against the force of the spring 26 to introduce pressurized fluid in to the chamber 20 of the actuator. This causes the actuator to pivot the swash plate and reduce the output of the pump until the pump supply pressure PSP balances the force of the spring 26 so that the output of the pump is held at the stand-by pressure ΔPst.

When a load sensing pressure signal LSP (or an increasing load sensing pressure signal) is reported to the LS pressure port 34 via the LS sensing line, this is added to the force of the spring 26 moving the valve spool so that the fluid pressure in the chamber 20 of the actuator is reduced. In response, the actuator 16 moves the swash plate to increase the output of the pump until the pump supply pressure PSP balances the force of the spring 26 and the load sensing pressure signal LSP. The pump therefore delivers a pump supply pressure PSP that is higher than the load sensing pressure LSP by the stand-by pressure differential ΔPst.

The pressure limiting valve 24 is usually held in the position shown by the spring 28 so that fluid passes into and out of the actuator chamber 20 under the control of the flow control valve 22. However, should the pump supply pressure PSP exceed the maximum permitted system pressure, as defined by the spring 28, the spool of the pressure limiting valve 24 is moved against the spring force to admit pressurized fluid into the chamber 20 of the actuator. This reduces the output of the pump until the pump supply pressure PSP it is brought back below the maximum permitted system pressure.

Generally, CC-LS systems are more expensive and complex than OC-LS systems but they have the advantage that the pump is only delivering above the stand-by pressure ΔPst on demand. This has a positive effect on the overall system efficiency. These systems are mainly used in high performance and high specification tractors (e.g. >100 KW) used to supply complex and powerful implements.

In contrast to CC-LS systems, OC-LS systems are provided with a fixed displacement pump. FIG. 2 illustrates part of a simplified OC-LS hydraulic circuit. A constant displacement pump 12' draws hydraulic fluid from a tank 14 and delivers it to various consumers (not shown) via a pump supply or pressure line P. Fluid is returned to the tank 14 from the consumers via a return or tank line T. A proportional pressure compensator valve 40 forms part of the pump supply and is operative to selectively connect the pump supply line P to the tank 14. The spool of the valve 40 is biased by a spring 44 towards a closed position, as shown, in which pump supply line P is not connected to the tank. This spring sets a static or stand-by pressure differential ΔPst and the spring force may be adjustable to enable the stand-by pressure differential ΔPst to be adjusted. The pump supply pressure PSP is applied to the opposite end of the spool via a pressure port 46 to oppose the force of the spring. The valve also has an LS pressure port 48 through which a consumer load sensing pressure signal LSP is applied to the valve spool to act in addition to the spring force.

In an idle mode in which there is no consumer demand, the pump supply pressure PSP opposes the spring force to open the valve and connect the pump supply line P to the tank. The pump supply pressure PSP in the pump supply line falls until it balances the spring force and is then held at the stand-by pressure differential ΔPst. If a consumer load sensing pressure signal LSP is forwarded to the valve 40 via the LS pressure port 48, this adds to the spring force tending to close the valve so that the pump supply pressure PSP increases until it balances the combination of the spring force and the load sensing pressure LSP. The pump supply pressure PSP is thereby held a level which is higher than the load sensing pressure LSP by the stand-by pressure differential ΔPst defined by the spring 44.

A further trend can be seen related to the supply and control means used on implements attached to an agricultural machine, such as a tractor. Due to increasing automation in agricultural work, implements are provided with more and more control functions which require complex control strategies. While in the past implements were equipped with only a few controllable drives (e.g. hydraulic cylinders or motors) which were controlled by valves on the tractor, today implements are provided with numerous controllable drives which cannot be controlled by the valves installed on the tractor. To address this, tractors are often equipped with power beyond systems (which may also be referred to in the art as high-pressure carry over). As the name suggests, these systems supply an uncontrolled (at the tractor) fluid flow from the pump supply to the implement via a respective interface, such as quick couplers. The implement itself is then equipped with control means in form of valves to adjust the parameters of the fluid supply. Similar to internal consumers on the tractor, these power beyond systems also include a LS function so that the load sensing pressure of consumers on the implement can be fed back to the pump supply on the tractor via a hydraulic LS line.

A typical power beyond interface 50 is illustrated in FIG. 1 and includes quick release hydraulic couplings 50a, 50b, 50c for releasably connecting a pump supply line P, a return or tank line T, and an LS signal line on the tractor to equivalent hydraulic lines Pi, Ti, LSi on the implement. As illustrated, the LS line (LSpb) from the power beyond interface which reports a LS signal from the consumers on the implement and an LS line (LSt) which reports a LS signal from the consumers on the tractor are connected to the LS pressure port 34 on the flow control valve 22 though a shuttle valve 52 or another functionally similar arrangement. This ensures that the highest LS load sensing pressure signal from the implement or the tractor is used to control the output of the pump. If there are a number of consumers on the implement, shuttle valves are used to ensure the highest LS load sensing pressure signal LSP of the implement consumers is fed through to the power beyond LS connection 50c. Similarly, if there are a number of consumers on the tractor, shuttle valves, or other functionally similar arrangements, are used to feed the highest LS load sensing pressure signal LSP of the tractor consumers to the LSt line and hence to the shuttle valve 52.

A major advantage of the power beyond system is that the costs involved with fluid supply control are moved from the tractor to the implement so that a wider range of applications can be handled by tractors with reduced hydraulic control capability. These power beyond systems have mainly been the reserve of tractors with higher performance (>100 KW)

and CC-LS systems. However, a demand has been recognized for smaller tractors with OC-LS systems to provide power beyond, for example vineyard tractors with about 70 kW have to provide a supply to complex implements such as fruit harvesters equipped with many hydraulic drives to be controlled.

A drawback with purely hydraulic LS arrangements is that the hydraulic load sensing pressure signal LSP has to be forwarded to the pump supply by hydraulic lines. If the load sensing pressure signal LSP comes from a consumer on an implement, a coupling is required to releasably connect the implement hydraulic LS signal line with a hydraulic LS signal line on the tractor. Furthermore, the various hydraulic LS signal lines from different consumers must be connected via shuttle valves to ensure that the highest consumer load sensing pressure LSP is forwarded to the pump supply. This all involves considerable additional expense and takes up valuable installation space. To overcome these drawbacks, electrohydraulic load sensing (E-LS) arrangements have been developed.

2007/0151238 A1, "Hydrostatic Drive System," published Jul. 5, 2007, discloses a hydrostatic drive system in which a variable displacement pump controller is actuated electronically by an electronic control device. A pressure sensor is used to detect a hydraulic consumer load sensing pressure LSP and provides an input to the electronic control system. The electronic control system generates an electronic control signal for actuating the displacement pump controller via a LS control valve to set the pump supply pressure PSP so that it is higher than the sensed load sensing pressure LSP by a set amount ΔPst. The system avoids the need for lengthy hydraulic LS load sensing pressure signal lines.

German Patent 102014103932 B3, "Control Device for a Hydraulic Working Machine, Hydraulic System and Method for Controlling a Hydraulic System," granted Jul. 23, 2015, discloses an E-LS system for an implement towed by a tractor. The towed implement has an electronic control device which determines the difference between the pump supply pressure PSP and the highest load sensing pressure LSP of the consumers on the towed implement. An electronic signal indicative of the pressure difference is forwarded to a hydraulic control module coupled to a LS connection of a variable displacement pump on the tractor. The hydraulic control module converts the electronic signal to a hydraulic control signal for controlling the pump displacement.

U.S. Patent Application Publication 2019/0345694 A1, "Hydraulic Control Arrangement for an Arrangement of Mobile Machines, and Arrangement of Mobile Machines," published Nov. 14, 2019, discloses a further E-LS system for a tractor and towed implement which does not necessarily require an electronic controller on the implement. In the arrangement disclosed, a pressure sensor is provided on the tractor to detect a hydraulic LS load sensing pressure signal LSP provided by the implement via a power beyond LS coupling. The pressure sensor forwards an electronic load sensing pressure signal ELSPS representative of the hydraulic load sensing pressure LSP to an electronic control unit on the tractor which controls a transducer (e.g. a solenoid actuated pressure limiting valve) to provide a hydraulic pump supply control signal HPSCS having a pressure $P_{set}$ for forwarding to a variable displacement pump controller. A further pressure sensor may be provided to forward an electronic load sensing pressure signal ELSPS representative of the highest load sensing pressure LSP of a number of consumers on the tractor. In this case, the electronic control unit selects the highest of the electronic load sensing pressure signals to use as a basis to control the transducer. The hydraulic pump supply control signal HPSCS output from the transducer may be connected with the pump controller via a shuttle valve, with a hydraulic load sensing pressure signal LSP from a steering system providing a further input to the shuttle valve. In this case, the highest pressure of the hydraulic pump supply control signal HPSCS from the transducer or the load sensing pressure LSP from the steering system is forwarded to the pump controller. This illustrates how E-LS and traditional hydraulic LS can be combined.

Arrangements for adjusting the pump supply pressure PSP in an E-LS system can be similar to those illustrated in either of FIGS. 1 and 2, except that a hydraulic pump supply control signal HPSCS for application to the LS pressure port 34, 48 of a flow control valve 22 or pressure compensator valve 40 is produced using a suitable transducer in dependence on an electronic pump supply control signal EPSCS from the controller. The transducer may be a solenoid-controlled pressure limiting valve, for example. The solenoid valve is actuated by the controller as a function of the hydraulic load sensing pressure demand LSP detected by a pressure sensor.

FIG. 3 illustrates how a pump supply 10 including a variable displacement pump 12 similar to that described above in relation to FIG. 1 can be adapted to incorporate a solenoid-controlled pressure limiting valve for use with an E-LS system. The pump supply 10 includes a flow control valve 22' to control the flow of fluid between the pump supply line P, the chamber 20 of the pump control actuator 16 and the tank 14. As in the hydraulic LS system of FIG. 1, a spring 26 sets the stand-by or static pressure differential and is opposed by the pressure in the pump supply line P connected to the pressure port 30 of the flow control valve 22'. However, for use in an E-LS system, the fluid pressure Pset supplied to the LS pressure port 34 is set by a solenoid-controlled pressure limiting valve 54. When no current is provided to the solenoid 56 of the pressure limiting valve 54, the LS pressure port 34 is fully connected to the tank 14 and the pump supply pressure PSP at port 30 is opposed only by the force of the spring 26 in the flow control valve 22' so that the pump output is maintained at the stand-by pressure $\Delta P_{st}$. When a consumer load sensing pressure LSP is detected by a pressure sensor and forwarded to a controller, the controller generates an electronic pump supply control signal EPSCS which is forward to the solenoid of the pressure limiting valve 54. The electronic pump supply control signal EPSCS actuates the pressure limiting valve 54 so that a hydraulic pump supply control signal HPSCS at a pressure $P_{set}$ is applied at the LS port 34 of the flow control valve 22' in addition to the spring force. This causes the pump displacement to be increased until the pump supply pressure PSP balances the combination of the spring force and the pressure $P_{set}$ of the hydraulic supply control signal HPSCS.

As illustrated in U.S. Patent Application Publication 2019/0345694 A1, the hydraulic pump supply control signal HPSCS generated by the pressure limiting valve 54 may be forwarded to the LS port 34 via a shuttle valve with a conventionally generated hydraulic load sensing pressure signal LSP provided as second input to the shuttle valve. This arrangement enables an E-LS system to be integrated with a conventional hydraulic LS system.

For use with a fixed displacement pump arrangement such as that illustrated in FIG. 2, a solenoid actuated pressure limiting valve 54 can be used to generate a hydraulic pump supply control signal HPSCS for application to the LS pressure port 48 of the pressure compensator valve 40.

Other electronically controlled transducer arrangements can be used to convert an electronic pump supply control signal EPSCS into a hydraulic pump supply control signal HPSCS.

Though the known E-LS systems and methods work well and alleviate some of the problems of a purely hydraulic LS system, they have their own drawbacks. One issue the applicant has found is that E-LS increases the overall reaction time to adjust the pump supply pressure PSP in response to an increase in consumer load sensing pressure LSP. This can be explained by the fact that in a hydraulic LS system, the load sensing pressure signal LSP is forward by a generally static fluid column in the LS lines which immediately forwards a load sensing pressure demand. In electrohydraulic E-LS systems, the pressure sensors must communicate with the controller and the controller must communicate with the solenoid pressure limiting valve or other actuator for adjusting the pump supply pressure. This communication typically takes place over CAN or ETHERNET-BUS Networks. As a consequence, the electronic LS signal transfer depends on cycle times and these depend on the performance levels of the components. With the numerous electronic control systems used in agricultural machines today, the overall response time may be considerably higher compared to purely hydraulic LS systems.

There is a need then for alternative methods of controlling a hydraulic supply system which overcome, or at least mitigate, some or all of the drawbacks of the known methods and a need to provide hydraulic supply systems configured to carry out such alternative methods.

BRIEF SUMMARY

Aspects of the disclosure relate to a control system for controlling a hydraulic supply system of a mobile machine and/or of a mobile machine and attached implement combination, to a mobile machine and/or a mobile machine and attached implement combination, and to a method for controlling a hydraulic system of a mobile machine and/or of a mobile machine and attached implement combination.

In some embodiments, there is provided a control system for controlling a hydraulic supply system on a mobile machine, wherein the hydraulic supply system includes a pump supply for supplying a pressurized fluid to a plurality of consumers on the mobile machine and/or an implement attached to the mobile machine. The control system comprises one or more controllers configured to receive, from a pressure sensor of a load sensing LS system associated with one or more of the plurality of consumers, a pressure signal indicative of a sensed load sensing pressure LSP associated with the one or more of the consumers; and be operative in a load sensing mode of control of the pump supply to compute and generate a control signal for regulating a pump supply pressure provided by the pump supply in dependence on a sensed load sensing pressure LSP. The one or more controllers are configured to receive data relating to one or more operative parameters of the mobile machine and/or an implement attached to the mobile machine and to determine from the data when at least one of the consumers is about to be actuated. The controllers are configured to be selectively operative in a predictive mode of control of the pump supply to compute and generate a control signal to adjust the pump supply to meet an expected hydraulic demand of the at least one of the consumers following a determination that the at least one of the consumers is expected to be actuated and/or that a predefined operational sequence is about to commence which is predicted to give rise to an increased hydraulic demand.

Predictively increasing the pump supply pressure to meet the known or predicted hydraulic demands of a consumer or consumers following a determination that the consumer or consumers is/are about to be actuated, e.g., as part of a known operational sequence, improves dynamic performance. This is particularly advantageous when actuation of a consumer or a number of consumers can be accurately predicted based on operational parameters of the mobile machine and/or attached implement.

The one or more controllers may be configured to compute and generate a control signal to adjust the pump supply to meet an expected hydraulic demand of the at least one of the consumers following a determination that the at least one of the consumers is to be actuated and prior to the at least one consumer generating a load sensing pressure LSP sufficient to initiate a load sensing based adjustment of the pump supply.

The one or more controllers may be configured to compute and generate a control signal to adjust the pump supply to meet an expected hydraulic demand of the at least one of the consumers following a determination that the at least one of the consumers is to be actuated and prior to the at least one consumer being actuated.

In an embodiment, in the predictive mode of operation, the one or more controllers may be configured to compute and generate a control signal to increase the pump supply pressure PSP of the pump supply.

The one or more controllers may collectively comprise an input (e.g. an electronic input) for receiving one or more input signals (e.g. the pressure signal) indicative of a sensed load sensing pressure LSP and one or more input signals (e.g. signals from sensors, operator input devices, and or cameras etc.) relating to the one or more operative parameters of the mobile machine and/or an implement attached to the mobile machine. The one or more controllers may collectively comprise one or more processors (e.g. electronic processors) operable to execute computer readable instructions for controlling operation of the control system, for example to determine the load sensing pressure LSP from a pressure signal received from a pressure sensor and to determine when the at least one of the consumers is about to be actuated. The one or more processors may be operable to generate one or more control signals for controlling the pump supply pressure PSP. The one or more controllers may collectively comprise an output (e.g. an electronic output) for outputting the one or more control signals, such as a pump supply control signal.

In an embodiment, the one or more controllers may be configured in the predictive mode of operation to determine an expected hydraulic load demand of the at least one of the consumers, to determine a suitable pump supply pressure PSP value to satisfy the expected hydraulic load demand, and to compute and generate a control signal to increase the pump supply pressure PSP to the determined suitable value.

In an embodiment, the one or more controllers may be configured to determine that more than one consumer is to be actuated, such as when a number of consumers are regularly actuated as part of a known operational sequence, in which case, the one or more controllers may be configured to compute and generate a control signal to pre-emptively increase the pump supply pressure PSP in order to satisfy a predicted combined hydraulic load demand of the consumers and/or to meet a predicted maximum hydraulic lead demand arising from actuation of the consumers in the operational sequence.

In an embodiment, the one or more controllers may be configured to revert to a load sensing mode of control of the pump supply after a set time limit following initiation of a predictive mode of control of the pump supply.

In an embodiment, the one or more controllers may be configured to monitor pressure signals indicative of a sensed load sensing pressure LSP from the one or more of the consumers following initiation of a predictive mode of control of the pump supply and to revert to a load sensing mode of control of the pump supply in dependence on at least one predefined operational parameter being met. The one or more controllers may be configured to receive, from a pressure sensor of the hydraulic supply system, a pressure signal indicative of the pump supply pressure PSP, and to revert to a load sensing mode of control of the pump supply if the pump supply pressure PSP is higher than the expected hydraulic load demand of the at least one of the consumers and the sensed load sensing pressure LSP.

Though initially raising the pump supply pressure when an increased hydraulic demand is predicted improves the dynamic response of the hydraulic system in actuating the at least one consumer, it is inefficient to maintain an unnecessarily high pump supply pressure. Accordingly, reverting to a load sensing mode of controlling the pump supply after a set time or when one or more operational conditions are met can help to maintain the overall efficiency of the system.

In an embodiment, the one or more controllers are configured to enter a predictive mode of control of the pump supply in respect of only one or some of the consumers and/or in response to a particular operational parameter being met.

Predictively raising the pump supply pressure can be advantageous if a high consumer demand can be accurately predicted and if a dynamic response is desirable but is not applicable in all circumstances. Thus, the control system will typically operate in a load sensing mode to control the pump supply pressure for the majority of time and only be triggered to enter a predictive mode of pump supply control in respect of certain consumers and/or in certain operational processes or circumstances. Thus, the predictive mode may only be initiated for certain operational tasks or sequences of tasks (events) carried out on the mobile machine or an attached implement.

In an embodiment, the one or more controllers may be configured to enter a predictive mode of control of the pump supply following a determination that a trigger event has occurred which is known to precede actuation of the at least one of the consumers.

If a particular operational event is known to precede actuation of one or more consumers, giving rise to an increase in hydraulic demand, detection of that event can be used to trigger a predictive mode of control of the pump supply.

In an embodiment, the one or more controllers may be configured to receive data relating to the one or more operative parameters of the mobile machine and/or an implement attached to the mobile machine from any one or more of the following: one or more sensors on the mobile machine and/or an implement attached to the mobile machine configured to detect at least one operational parameter of the mobile machine and/or the implement; control signals relating to actuation of one or more of the consumers or other actuators on the mobile machine and/or an implement attached to the machine; and one or more cameras on the mobile machine and/or an attached implement.

In an embodiment, the one or more controllers may be configured when operative in the load sensing mode of pump supply control to determine, from the received pressure signal indicative of a sensed load sensing pressure LSP associated with the one or more of the consumers, a rate of change of the load sensing pressure LSP; and compute and generate a control signal for regulating the pump supply pressure PSP provided by the pump supply in dependence on the on the determined rate of change of the LSP. The one or more controllers may be configured to increase the pump supply pressure PSP provided by the pump supply in dependence on the on a determined rate of increase of the LSP when operating in a load sensing mode of control of the pump supply.

In an embodiment, the one or more controllers may be configured when operative in the predictive mode of pump supply control to determine an operational response of the at least one of the consumers with reference to an operational target associated with the at least one of the consumers.

The operational target may be a time limit for response of the at least one of the consumers. In an embodiment, data from one or more sensors arranged to determine response of the consumer may be provided to the one or more controllers which are configured to automatically adjust the set point for the pump supply pressure as to meet the set time limit using the lowest possible pump supply pressure PSP.

In an embodiment, the one or more controllers may be configured to: store (in a memory accessible by the one or more controllers) predetermined value(s) for the pump supply pressure PSP suitable to satisfy the hydraulic load demand of the at least one of the consumers in dependence on the determined operational response "meeting" the operational target; and retrieve/apply stored predetermined value(s) for the pump supply pressure PSP during subsequent implementation of a predictive mode of pump supply control for the at least one of the consumers.

In an embodiment, the one or more controllers may be configured to store (in a memory accessible by the one or more controllers) the adjusted set point; and retrieve/apply stored adjusted set point for the pump supply pressure PSP on subsequent initiations of a predictive mode of pump supply control for that consumer/event in the same circumstances.

Thus, the control system may be self-learning and adjust the amount and timing of the increase in pump supply pressure when operative in the predictive mode to meet the hydraulic demand of a particular consumer and/or a particular operation dynamically while also maintaining overall efficiency. The balance between dynamic response and efficiency may be pre-set or the control system may enable an operator to adjust the balance by requesting higher dynamic response or greater efficiency. The system may enable the operator to select between different modes of operation, which may include a dynamic mode in which dynamic response is prioritized over efficiency or an efficient mode in which the economy is priorities over efficiency. There may also be a balanced mode between these two.

The one or more controllers may be configured to generate an electronic pump supply control signal, the control system comprising a transducer for converting the electronic pump supply control signal to a hydraulic pump supply control signal HPSCS having a pressure $P_{set}$ for forwarding to a hydraulic pump supply adjustment system.

The hydraulic system may include more than one consumer and more than one pressure sensor, each pressure sensor for sensing a load sensing pressure LSP associated with one or more of the consumers, in which case, the one or more controllers may be configured to receive pressure signals indicative of sensed load sensing pressure LSP from each of the pressure sensors and to adjust the pump supply pressure in dependence on the pressure signal indicative of the highest load sensing pressure LSP at any given time when operating in a load sensing mode for controlling the pump supply.

The hydraulic system may comprise at least one consumer on an implement attached to the mobile machine which is supplied with pressurized fluid from the pump supply on the mobile machine, in which case, the one or more controllers may be configured to receive, from a pressure sensor of a load sensing LS system associated with the at least one consumer on the implement, a pressure signal indicative of a sensed load sensing pressure LSP associated with the at least one consumer on the implement.

In an embodiment, the one or more controllers comprise at least a first controller on the mobile machine and a second controller on the implement; the first and second controllers being in communication with one another.

In an embodiment, the pump supply includes a variable displacement pump having a pump controller including a flow control valve for regulating movement of an actuator to adjust the pump displacement. In this embodiment, the one or more controllers may be configured to generate an electronic pump supply control signal, the control system comprising a transducer for converting the electronic pump supply control signal to a hydraulic pump supply control signal HPSCS having a pressure $P_{set}$ for forwarding to an LS pressure port of the flow control valve. The transducer may be a solenoid-controlled pressure limiting valve.

In an alternative embodiment, the pump supply includes a fixed displacement pump, the pump supply comprising a pressure compensator valve for selectively connecting a pump supply line to a reservoir (tank) to vary the pump supply pressure PSP. In this embodiment, the one or more controllers may be configured to generate an electronic pump supply control signal, the control system comprising a transducer for converting the electronic pump supply control signal to a hydraulic pump supply control signal HPSCS having a pressure $P_{set}$ for forwarding to an LS pressure port of the pressure compensator valve. The transducer may be a solenoid-controlled pressure limiting valve.

In some embodiments, there is provided a mobile machine comprising a hydraulic supply system including a pump supply for supplying a pressurized fluid to a plurality of consumers on the mobile machine and/or an implement attached to the mobile machine and a control system for controlling the hydraulic supply system described above. The mobile machine may be part of a combination comprising the mobile machine and an attached implement, wherein the implement has one or more consumers supplied with pressurized fluid from the pump supply. The mobile machine may be a mobile agricultural machine, such as a tractor. The attached implement may be an agricultural implement.

In in another embodiment, there is provided a mobile machine having a hydraulic supply system which includes a pump supply for supplying a pressurized fluid to a plurality of consumers on the mobile machine and/or an implement attached to the mobile machine and an electronic load sensing (E-LS) system operative in use to adjust a pump supply pressure provided by the pump supply in dependence on a sensed load sensing pressure LSP associated with one or more of the consumers, the mobile machine configured to determine when a predetermined operational sequence giving rise to an increased hydraulic demand is about to commence and to increase the pump supply pressure following such a determination.

The mobile machine may be configured to determine that the predetermined operational sequence is about to commence on detection of a trigger event which is known to precede the predetermined operational sequence.

The mobile machine may be part of a combination comprising the mobile machine and an attached implement, wherein the implement has one or more consumers supplied with pressurized fluid from the pump supply. The mobile machine may be a mobile agricultural machine, such as a tractor. The attached implement may be an agricultural implement.

The mobile machine may have a control system as set out above, wherein the at least one of the consumers is actuated as part of the predetermined operational sequence.

In further embodiments, there is provided a method of controlling a hydraulic supply system on a mobile machine, wherein the hydraulic supply system includes a pump supply for supplying a pressurized fluid to a plurality of consumers on the mobile machine and/or an implement attached to the mobile machine, the hydraulic supply system comprising an electronic load sensing (E-LS) system operative to adjust a pump supply pressure provided by the pump supply in dependence on a sensed load sensing pressure LSP associated with one or more of the consumers in a load sensing mode of control of the pump supply;

the method comprising selectively controlling the pump supply in a predictive mode by adjusting the pump supply in response to a determination that at least one of the consumers is to be actuated or that a predefined operational sequence is about to commence which is predicted to give rise to an increased hydraulic demand.

Predictively adjusting the pump supply following a determination that a consumer is to be actuated can be used to improve dynamic performance, such as by raising the pump supply pressure to meet an expected hydraulic demand when the consumer is actuated. This is particularly advantageous if actuation of a consumer or a number of consumers can be accurately predicted based on other operational parameters of the mobile machine and/or attached implement.

The method may comprise monitoring data relating to operational parameters of the mobile machine and/or an implement attached to the mobile machine and determining from the data when the at least one of the consumers is about to be actuated.

The method may comprise monitoring data relating to operational parameters of the mobile machine and/or an implement attached to the mobile machine in order to detect a trigger event which is known to preceded a predefined operational sequence which includes actuation of the at least one the consumers and determining that the at least one of the consumers is to be actuated, or that the predefined operational sequence is about to commence, when the trigger event is detected.

The method may comprise adjusting the pump supply in order to satisfy an expected hydraulic load demand of the at least one of the consumers.

The method may comprise adjusting the pump supply in order to satisfy an expected hydraulic load demand of the at least one of the consumers in response to a determination that the at least one of the consumers is to be actuated prior to the actuation of the consumer or at least before the consumer generates a load sensing pressure LSP sufficient to initiate a load sensing based adjustment of the pump supply.

In an embodiment the method comprises adjusting the pump supply by increasing the pump supply pressure PSP of the pump supply.

In an embodiment, the method comprises an expected hydraulic load demand of the at least one of the consumers, determining a suitable pump supply pressure PSP value to satisfy the expected hydraulic load demand, and pre-emptively increasing the pump supply pressure PSP to the determined suitable value.

The method may comprise reverting to a load sensing mode of control of the pump supply after a set time limit after the pump supply is adjusted in a predictive mode of control.

Though initially raising the pump supply pressure improves the dynamic response, it may be inefficient to maintain an unnecessarily high pump supply pressure. Accordingly, reverting to a load sensing mode of controlling the pump supply after a set time or when one or more operational conditions are met can help to maintain the overall efficiency of the system.

In an embodiment, the method comprises reverting to a load sensing mode of control of the pump supply if the pump supply pressure PSP is higher than the expected hydraulic load demand and a sensed load sensing pressure LSP.

The method may comprise using the electronic load sensing E-LS system to regulate the pump supply pressure PSP in dependence on the rate of change of a load sensing pressure LSP when operating in a load sensing mode of control of the pump supply. The method may comprise increasing the pump supply pressure PSP provided by the pump supply in dependence on a determined rate of increase of the LSP when operating in a load sensing mode of control of the pump supply.

The control system may comprise one or more controllers configured to receive, from a pressure sensor of a load sensing LS system associated with the one or more of the plurality of consumers, a pressure signal indicative of a sensed load sensing pressure LSP associated with the one or more of the consumers; and when operating in a load sensing mode of control of the pump supply, compute and generate a control signal for regulating a pump supply pressure provided by the pump supply in dependence on the sensed load sensing pressure LSP. The one or more controllers are configured to receive data relating to one or more operational parameters of the mobile machine and/or an implement attached to the mobile machine. The method comprises using the one or more controllers to determine from the data relating to the one or more operational parameters of the mobile machine and/or an implement attached to the mobile machine when the at least one of the consumers is to be (or is being) actuated, or the predefined operational sequence is about to commence, and to compute and generate a control signal to pre-emptively adjust the pump supply in order to satisfy an expected hydraulic load demand of at least one of the consumers or sequence.

The method may comprise determining an operational response of the at least one consumer with reference to an operational target associated with the at least one consumer following adjustment of the pump supply in a predictive mode of control.

The operational target may be a time limit for response of the at least one of the consumers. In an embodiment, data from one or more sensors arranged to determine response of the consumer may be used to adjust the set point for the pump supply pressure so as to meet the set time limit using the lowest possible pump supply pressure PSP.

The method may comprise storing predetermined value(s) for the pump supply pressure PSP suitable to satisfy the hydraulic load demand of the at least one of the consumers in dependence on the determined operational response "meeting" the operational target; and retrieve/apply stored predetermined value(s) for the pump supply pressure PSP during subsequent implementation a predictive mode of control for the at least one of the consumers.

In an embodiment, the method comprises storing the adjusted pump supply pressure set point and subsequently retrieving/applying the stored adjusted set point for the pump supply pressure PSP on subsequent initiations of a predictive mode of pump supply control for the at least one of the consumers as part of the same predefined operational sequence.

Accordingly, the method may comprise automatically adjusting various parameters for controlling the pump supply, such as the amount and timing of the increase in pump supply pressure, while also maintaining overall efficiency. The method may comprise setting a preferred balance between dynamic response and efficiency.

The method may comprise generating an electronic pump supply control signal for adjusting the pump supply and using a transducer for converting the electronic pump supply control signal to a hydraulic pump supply control signal HPSCS having a pressure $P_{set}$ for forwarding to a hydraulic pump supply adjustment system.

In some embodiments, there is provided computer software comprising computer readable instructions which, when executed by one or more processors, causes performance of the method described above.

Some embodiments include a computer readable storage medium comprising the computer software described above. Optionally, the storage medium comprises a non-transitory computer readable storage medium.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Embodiments will now be described, by way of example only, with reference to the further accompanying drawings, in which.

DETAILED DESCRIPTION

Figure 4:
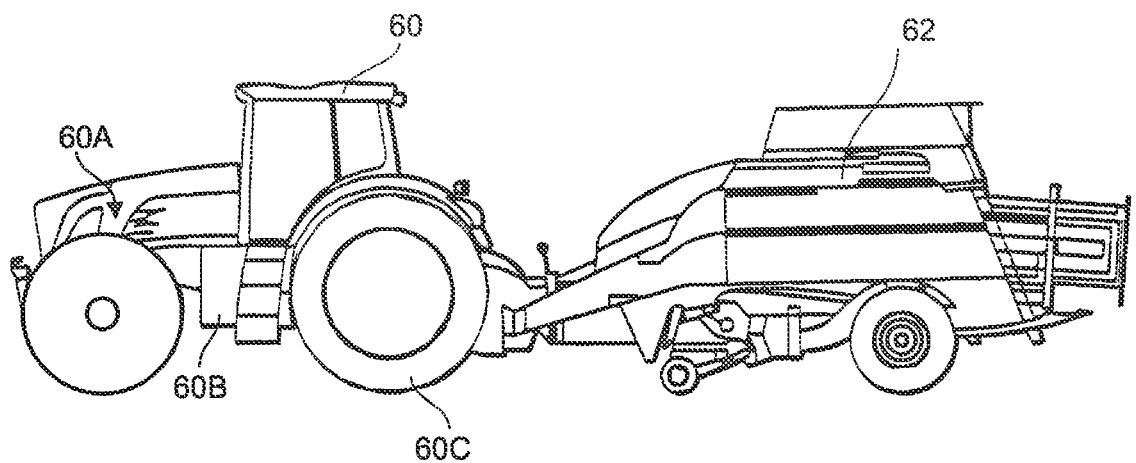
FIG. 4 is a schematic side view of an agricultural machine and implement combination.

FIG. 4 illustrates a combination comprising a mobile agricultural machine 60 and an implement 62 attached to the rear of the machine. The implement 62 can be any suitable agricultural implement attachable to an agricultural machine having hydraulic consumers supplied with pressurized hydraulic fluid from a hydraulic supply system on the machine 60. The implement 62 will be referred to as a rear implement 62 and a further implement having hydraulic consumers fed by the supply on the machine, not shown in FIG. 4 but see FIG. 5, may be attached to the front of the tractor and will be referred to as a front implement 63.

The agricultural machine in the embodiment shown in the drawings and described below is specifically an agricultural tractor 60 and the rear implement 62 is a baler. Other types of agricultural implement commonly used with tractors include without limitation: a loading wagon, a towed sprayer, a plough, a row unit planter, and a towed potato harvester. Furthermore, the disclosure is not limited to application on tractors or other mobile agricultural machines but can be adapted for use with other mobile machines having a hydraulic supply system whether connected with an implement or not.

Figure 5:
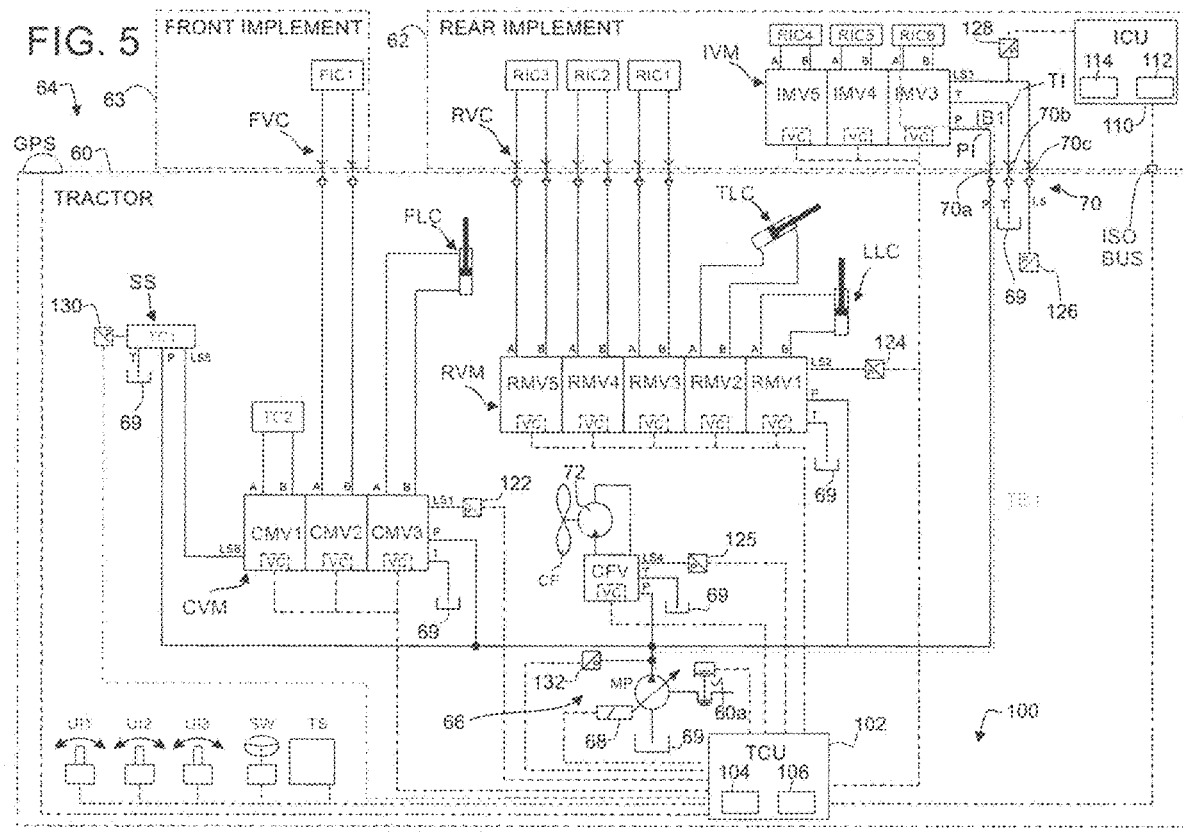
FIG. 5 is a schematic representation of an embodiment of a hydraulic system embodied in the combination of FIG. 4.

FIG. 5 is a simplified representation of a hydraulic supply system 64 suitable for use on the tractor 60 and implement 62, 63 combination. The hydraulic supply system 64 incorporates an E-LS system and is configured as disclosed herein.

Hydraulic Network

The hydraulic supply system 64 has pump supply 66 including main pump MP which is of variable displacement type and a pump output controller 68 for adjusting the displacement of the pump. In an embodiment, the pump output controller 68 is configured in a manner similar to that illustrated in FIG. 3. However, in other embodiments, alternative pump output controller arrangements can be adopted including any of those currently used with E-LS systems which enable an electronic controller to regulate and adjust the flow and/or pressure output of the pump supply 66.

The pump MP draws fluid from a tank 69 and supplies pressurized hydraulic fluid at a pump supply pressure PSP to consumers on the tractor and the implement via a pump supply line P. The tank 69 provides a reservoir for the hydraulic supply system in which the fluid is held generally at ambient pressure. The tank 69 is illustrated schematically in FIG. 5. In practice in any given hydraulic supply system 64 there may a single tank 69 or multiple tanks 69.

The consumers on the tractor 60 include a hydraulic steering system SS, a central valve manifold CVM, and a rear valve manifold RVM.

The steering system SS may include a hydraulic cylinder and control valve designated tractor consumer TC1 for moving the steered wheels. The control valve is connected to the pump supply line via a pressure port P and to the tank via a tank port T.

The central valve manifold CVM is installed generally in the middle of the tractor and includes a number of functional valves for controlling a corresponding number of hydraulic consumers usually located in or towards the middle and front area of the tractor. In the example illustrated, the central valve manifold CVM includes three functional valves CMV1, CMV2, CMV3 assembled together and connected to the pump supply line via a common pressure port P and to a return line to the tank at a common return port T. Each valve is assigned to a specific consumer and the valves CMV1, CMV2, CMV3 may have different configurations (e.g., ON/OFF, proportional valves, 3/2 valves, 4/2 valves) according to the functional needs of their respective consumer. The valves CMV1, CMV2, CMV3 are solenoid valves and each has a valve controller VC for controlling the solenoid. The number and configuration of the valves in the CVM may be varied to meet the requirements of the tractor manufacturer and/or the end customer. There may, for example, be more or fewer than three functional valves in the CVM.

The CVM has a common load sensing port LS1 and each of the valves CMV1, CMV2, CMV3 have LS ducts connected to the common LS port LS1 by means of shuttle valves so that the highest load sensing pressure LSP generated by the various valves CMV1, CMV2, CMV3 at any given point in time is forwarded to the LS port.

The CVM can be used to supply hydraulic fluid to various consumers such as, without limitation, a front linkage actuator FLC and an axle suspension system indicated as tractor consumer TC2. Valves in the CVM can also be used to supply consumers on a front implement 63 attached to the tractor indicated as FIC1. Each consumer on the front implement 63 being hydraulically connected to a respective valve CMV2 via front valve couplings FVC.

The RVM is installed in or towards the rear of the tractor and is provided to supply consumers which are mainly in the rear area of the tractor and/or on a rear implement 62. The RVM is similar to the CVM in terms of design and variability and contains a number of functional valves indicated as RMV1 to RMV5 assembled together and connected to the pump supply line via a common pressure port P and to a return line to the tank at a common return port T. At least some of the valves in the RVM may be used to supply consumers on a rear implement 62 and/or on the tractor 60. In the exemplary embodiment illustrated, three of the valves, RMV3, RMV4, and RVM5, are connected with respective consumers RIC1, RIC2, RIC3 on the rear implement 62 via rear valve couplings RVC. The RVC may be directly flanged to the RVM as described in European Patent Application Publication 2886926 A1, "Hydraulic Coupling Seal," published Jun. 24, 2015. As it is common to attach complex implements to the rear of a tractor, there may be more than three valves in the RVM for connection to consumers on a rear implement 62. There may, for example, be as many as six, seven, eight or more valves in the RVM assigned for connection to consumers on rear implements. At least some of the valves in the RVM may be assigned to consumers located at or towards the rear of the tractor such as actuators on a rear linkage system. In the exemplary embodiment shown, valve RMV1 is assigned to a pair of lower link hydraulic cylinders LLC being supplied in parallel and valve RMV2 is assigned to a hydraulically driven top link actuator cylinder TLC. In an alternative embodiment, the top link actuator may be a mechanical actuator and the valve RMV2 used for other purposes.

Each valve RMV1 to RMV5 in the RVM is a solenoid actuated valve and is provided with a valve controller VC which moves the solenoid and provides a pilot pressure. Each valve is configured according to the requirements of its respective consumer (e.g., ON/OFF, proportional valves, 3/2 valves, 4/2 valves).

The RVM has a common load sensing port LS2 and LS ducts of the valves RMV1, RMV2, RMV3, RMV4, RMV5 are all connected to the common LS port LS2 by means of shuttle valves so that the highest load sensing pressure LSP generated by the various valves at any given point in time is forwarded to the common LS port LS2.

As with the CMV, the RVM can be configured to have any required number and configuration of valves depending on the number and requirements of the hydraulic consumers on the tractor and any implements that are expected to be attached to the tractor. It should be understood, therefore, that the configuration of the CVM and RVM shown in FIG. 5 is for illustrative purposes only and can be varied.

The hydraulic supply system 64 includes a power beyond interface 70 to provide an "uncontrolled" supply of pressurized fluid to a rear implement 62 which requires more hydraulic functions than can be controlled using the available valves on the tractor. Such a complex implement 62 may be a baler, for example. The power beyond interface 70 includes quick release couplings 70a, 70b to connect the pump supply line P and a return tank line T on the tractor to a pump pressure supply line PI and a return line TI respectively on the implement 62. The power beyond interface provides a pressurized fluid supply to an implement which is at the pump supply pressure PSP but which is otherwise uncontrolled on the tractor.

In a typical arrangement, the rear implement 62 has an implement valve manifold IVM similar to the CVM and RVM as described above. The IVM has a number of functional control valves IMV1 to IMV3 which are each connected to the implement pump supply pressure line PI through a common pressure port P and to the implement return line TI via a common return port T. The IVM also has a common LS pressure signal port LS3 to which LS ducts of each of the valves IMV1 to IMV3 are connected via a series of shuttle valves arranged so that the highest consumer load sensing pressure LSP from the various valves in the IVM at any given point in time is reported to the common LS port LS3. Each valve IMV1 to IMV3 is connected to a respective consumer (e.g. a hydraulic cylinder or hydraulic motor) which are schematically designated RIC4 to RIC6. Each valve is configured according to the requirements of its respective consumer (e.g., ON/OFF, proportional valves, 3/2 valves, 4/2 valves). The valves are all solenoid-controlled valves and each is provided with an electronic valve controller VC which moves the solenoid and provides a pilot pressure (supplied via pump connection to support the valve slider movement).

The number of valves in the IVM is selected depending on the number of consumers on the implement that are to be supplied via the power beyond interface and can be varied as required. Furthermore, there may be more than one valve manifold on the implement and/or one or more separate valves not incorporated into a manifold can be connected to the power beyond interface via suitable hydraulic lines.

In the embodiment shown, the tractor has a further hydraulic consumer in the form of a hydraulic motor 72 for driving a cooling fan CF. The hydraulic motor 72 is controlled by a cooling fan valve CFV which regulates the cooling fan motor to vary the speed of the fan. The CFV is a solenoid-controlled valve having an electronic valve controller VC which is operably connected with an electronic controller 102 on the tractor. The controller is configured to actuate the CFV in order to adapt the motor speed to the cooling demand.

Figure 3:
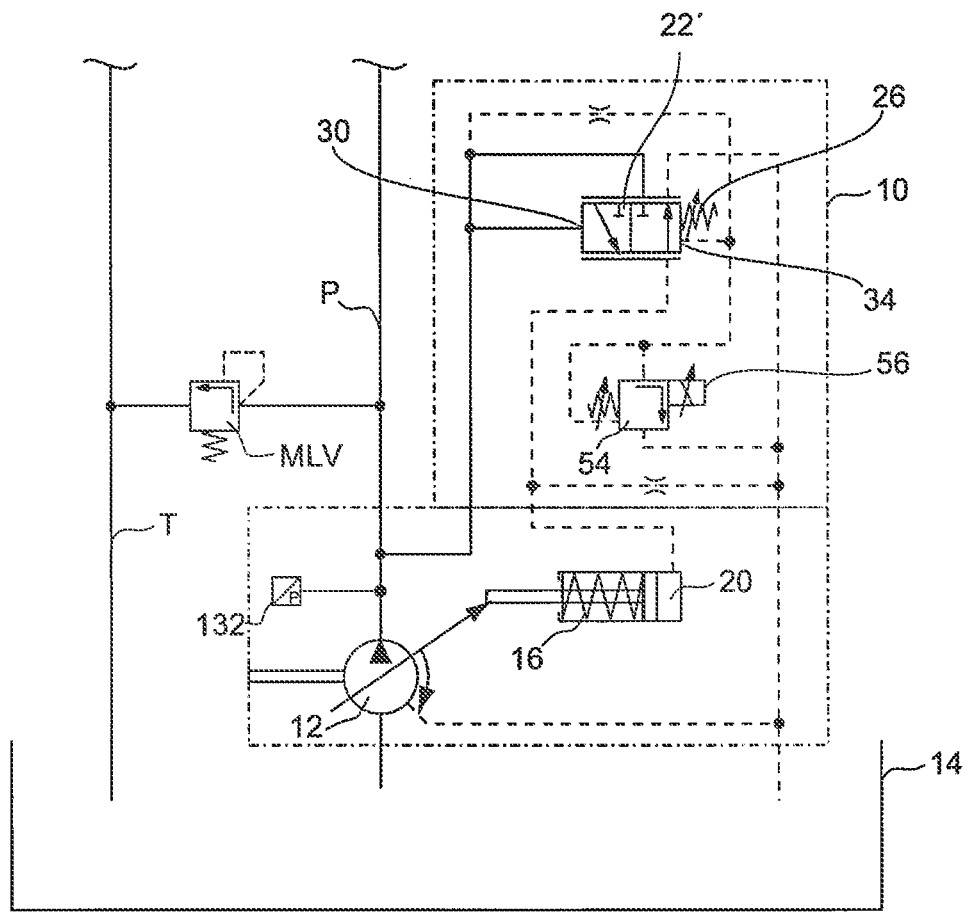
FIG. 3 illustrates how a pump supply including a variable displacement pump can be adapted to incorporate a solenoid-controlled pressure limiting valve for use with an E-LS system.

As illustrated in FIG. 3, the hydraulic supply system may also be provided with a main pressure limiting valve MLV which opens to vent the pump supply P to the tank 69 if the pressure exceeds a predetermined pressure. The MLV is set to open at a pressure above the maximum permitted operating pressure of the system. This provides an additional level of safety in case the limitation of the pump supply pressure PSP through the pump controller should fail. For use with current tractor hydraulic supply systems the MLV may be set to open a pressure value of around 250 bar for example. However, the pressure at which the MLV opens can be selected as required for any given system.

The hydraulic supply system 64 illustrated in FIG. 5 is exemplary only and can be modified for use with hydraulic supply systems which have alternative layouts, including an alternative number and type of consumers and control valves. For example, the tractor 60 may have more than one pump and may have a fixed displacement pump in addition to the main pump MP for supplying other consumers such as a lubrication system for the driveline, a transmission (of hydrostatic-mechanical split type) or a hydraulic brake system, for example. These are not shown in FIG. 5 as they are not included in the E-LS control arrangements which are the subject of the present disclosure.

Electronic Network

FIG. 5 also illustrates an electronic control system network 100 for the hydraulic supply system 64. As shown, the control network 100 includes a controller 102 on the tractor having an electronic processor 104. The processor 104 is operable to access a memory 106, which may be part of the controller 102, and execute instructions stored therein to perform the steps and functionality disclosed. The memory 106 may include any one or a combination of volatile memory elements (e.g., random-access memory RAM, such as DRAM, and SRAM, etc.) and non-volatile memory elements (e.g., ROM, hard drive, tape, CDROM, etc.). The memory 106 may store a native operating system, one or more native applications, emulation systems, or emulated applications for any of a variety of operating systems and/or emulated hardware platforms, emulated operating systems, etc. The memory 106 may furthermore store parameters or settings needed to operate the control systems and/or perform the methods as described below.

It should be appreciated by one having ordinary skill in the art that in some embodiments, additional or fewer software modules (e.g., combined functionality) may be stored in the memory 106 or in additional memory. In some embodiments, a separate storage device may be coupled to the data bus, such as a persistent memory (e.g., optical, magnetic, and/or semiconductor memory and associated drives). In a further embodiment, the memory 106 may be connectable with an off-board network architecture (via mobile communication or WLAN) to provide parameters or settings.

The processor 104 may be embodied as a custom-made or commercially available processor, a central processing unit (CPU) or an auxiliary processor among several processors, a semiconductor based microprocessor (in the form of a microchip), a macro processor, one or more application specific integrated circuits (ASICs), a plurality of suitably configured digital logic gates, and/or other well-known electrical configurations comprising discrete elements both individually and in various combinations to coordinate the overall operation of the controller 102.

Electronic communications among the various components of the control network 100, as indicated by the dashed lines, may be achieved over a controller area network (CAN) bus or via a communications medium using other standard or proprietary communication protocols (e.g., RS 232, Ethernet, etc.). Communication may be achieved over a wired medium, wireless medium, or a combination of wired and wireless media.

The controller 102 is in communication with each of the electronic solenoid valve controllers VC of the various valves on the tractor, with the pump output controller 68, and with various user interfaces such as a steering wheel SW, valve rockers represented as UI1 and UI2, a linkage control represented as UI3, and a touch screen TS. The touch screen is typically located within a cab of the tractor to provide information to the driver and receive input (e.g. to select, adjust and/or save settings). The touch screen TS may alternatively be replaced or enhanced by a keyboard to receive input. Indeed, any input or presentation of information whether by manual, speech or gestures may be included herein. Each user interface UI may be permanently assigned to one consumer of the tractor or the implement. Alternatively, one or more of the user interfaces may be variably assignable to any one of two or more consumers by the operator. Such an assignment might be effected via the touch screen, for example.

The controller 102 may also receive further data, such as location data from a GPS receiver to determine the current position of the tractor, and/or may be operative control further devices.

The rear implement 62 may also be connected to the tractor controller 102, such as via a standardized agricultural ISOBUS for example, to exchange data and control between the implement and tractor as described later on. For this purpose, the implement 62 may be provided with an implement controller 110 which communicates with the tractor controller 102. If present, an implement controller 110 may have an electronic processor 114 which is operable to access a memory 112 of the implement controller 110 and execute instructions stored therein to perform the steps and functionality.

The memory 112 may include any one or a combination of volatile memory elements (e.g., random-access memory RAM, such as DRAM, and SRAM, etc.) and non-volatile memory elements (e.g., ROM, hard drive, tape, CDROM, etc.). The memory 112 may store a native operating system, one or more native applications, emulation systems, or emulated applications for any of a variety of operating systems and/or emulated hardware platforms, emulated operating systems, etc. The memory 112 may furthermore store parameters or settings needed to operate the control systems as described below.

It should be appreciated by one having ordinary skill in the art that in some embodiments, additional or fewer software modules (e.g., combined functionality) may be stored in the memory 112 or in additional memory. In some embodiments, a separate storage device may be coupled to the data bus, such as a persistent memory (e.g., optical, magnetic, and/or semiconductor memory and associated drives). In a further embodiment, the memory 112 may be connectable with an off-board network architecture (via mobile communication or WLAN) to provide parameters or settings.

The processor 114 may be embodied as a custom-made or commercially available processor, a central processing unit (CPU) or an auxiliary processor among several processors, a semiconductor based microprocessor (in the form of a microchip), a macro processor, one or more application specific integrated circuits (ASICs), a plurality of suitably configured digital logic gates, and/or other well-known electrical configurations comprising discrete elements both individually and in various combinations to coordinate the overall operation of the controller 102.

Load Sensing

Returning to the hydraulic supply system, at any given time, a highest of the load sensing pressure demands LSP from the consumers on the tractor 60 and any attached implements 62 is used to regulate the pump output controller 68 by means of a load sensing LS system. The load sensing system includes an electronic (electrohydraulic) load sensing (E-LS) system including a number of pressure sensors for sensing load sensing pressure demand signals LSP from consumers which are part of the E-LS system. Each of the pressure sensors is in communication with a controller 102 or 110 and forwards to the controller an electronic load sensing pressure signal ELSPS (a pressure signal) representative of the sensed consumer load sensing pressure LSP.

The electronic load sensing pressure signal ELSPS may be an analogue signal in which a characteristic of the signal is modulated in dependence on the pressure of the hydraulic load sensing pressure signal LSP. In an embodiment, the current of the ELSPS is modulated in dependence on the pressure of the hydraulic load sensing pressure signal LSP but in another embodiment it is the voltage. In an embodiment in which the ELSPS is an analogue signal, the controller 102, 110 converts the ELSPS into a pressure value by reference to data stored in the controller (or to which the controller has access) which provides a correlation between the modulated characteristic and pressure for the sensed load sensing pressure LSP. This data may be provided in the form of a characteristic map or a look up table assigned to the sensor. In another embodiment, the pressure sensor has a CPU and communicates with the controller through a CAN interface. In this case, conversion of the analogue signal to a pressure value is made at the sensor and the pressure value forwarded to the controller 102, 110.

In the embodiment illustrated, a first pressure sensor 122 is connected with the LS port LS1 on the CVM, where it is subject to the highest consumer load sensing pressure signal LSP of the valves in the CVM. A second pressure sensor 124 is connected with an LS port LS2 on the RVM, where it is subject to the highest consumer load sensing pressure signal LSP of the valves in the RVM. A third pressure sensor 125 is connected with an LS port LS4 on the cooling fan valve CFV to sense the load sensing pressure of the cooling fan motor.

A fourth pressure sensor 126 on the tractor is connected with a LS coupling 70c of the power beyond interface. On the implement, the LS power beyond coupling may be hydraulically connected with the common LS port LS3 of the IVM so that the highest load sensing pressure demand LSP from the various valves in the IVM is forwarded to the fourth pressure sensor 126 when the implement is coupled to the tractor. However, for implements which have a controller 112, an implement pressure sensor 128 can be connected with the common LS port LS3 of the IVM. In this case, the implement pressure sensor 128 communicates with the implement controller 112 and forwards to the implement controller 112 an electronic load sensing pressure signal ELSPS representative of the sensed consumer load sensing pressure LSP at the IVM common LS port LS3. The implement controller 112 forwards data relating to the sensed load demand pressure LSP to the tractor controller 102. The implement controller 110 may process the load sensing pressure demand data and forward to the tractor controller 102 data which is modified or a signal which is a function of the sensed load sensing pressure signal LSP.

The load sensing pressure demand LSP of the steering system is also sensed electronically to form part of the E-LS system. FIG. 5 illustrates two alternative arrangements. In one embodiment, an LS port LS5 of the steering system actuator/control valve TC1 is hydraulically connected by a LS signal line to an LS input port LS6 on the CVM. The LS input port LS6 is connected together with the LS ducts of each of the valves in the CVM to the common LS port LS1 by a suitable cascade of shuttle valves so that the highest load sensing pressure demand LSP from the steering system and the various valves CMV1 To CMV3 is reported to the common LS port LS1 to be sensed by the first pressure sensor 122. In an alternative embodiment, a dedicated pressure sensor 130 is provided to sense the load demand pressure LSP of the steering system. The steering system pressure sensor 130 may be hydraulically connected to the LS port of the steering system and electronically connected to the tractor controller 102 to forward to the controller an electronic load sensing pressure signal ELSPS representative of a sensed consumer load sensing pressure LSP of the steering system.

The tractor controller 102 is configured to select an electronic load sensing pressure signal ELSPS representative of the highest consumer load sensing pressure LSP forwarded to it, either directly from a pressure sensor or from the implement controller 112. The controller processes the selected signal and forwards an electronic pump supply control signal EPSCS to the output controller 68 of the main pump MP to vary the output of the pump MP in dependence on the highest sensed load sensing pressure LSP. If the pump output controller 68 comprises a solenoid controlled pressure limiting valve 54 as illustrated in FIG. 3, the tractor controller 102 forwards an electronic pump supply control signal EPSCS to actuate the solenoid of the pressure limiting valve 54 in order to vary the output of the main pump. Typically, the current of the electronic pump supply control signal EPSCS will determine the extent of movement of the solenoid and so will determine the pressure $P_{set}$ of the resulting hydraulic pump supply control signal HPSCS applied to the LS port 34 of the flow control valve 22' and hence the supply pressure PSP of the main pump. The resulting pump supply pressure PSP can be calculated by equation 1:

$$PSP = \Delta P_{st} + P_{set} \quad \text{Equation 1}$$

where $\Delta P_{st}$ is the static or stand-by pressure differential defined by the spring 26 in the flow control valve 22', and $P_{set}$ is the pressure of the hydraulic pump supply control signal HPSCS provided at the LS pressure port of the flow control valve.

If the implement has an electronical controller 110, communication between the tractor controller 102 and electronic components of the LS pressure control system on the implement, such as valve controllers VC and pressure sensors 128 of the IVM, is typically made via the implement controller 110, with data and instructions being transmitted between the implement controller 110 and the tractor controller 102 via a standardized ISOBUS connection.

In an embodiment, the controller 102 converts a target pressure value for $P_{set}$ to a current value for forwarding to the solenoid-controlled pressure limiting valve 54 (or other transducer) as an analogue electronic pump supply control signal EPSCS. In another embodiment, the pump output controller 68 has a CPU and communicates with the controller 102 through a CAN interface. In this case, the controller 102 forwards the target set point pressure value $P_{set}$ to pump controller 66 in an electronic pump supply control signal EPSCS through a CAN interface and the pump CPU converts the pressure value to an analogue signal for controlling the pressure limiting valve 54 or other transducer.

Conversion of the target pressure value for $P_{set}$ to a current value may be made by reference to data which provides a correlation between a current value and the resulting pressure $P_{set}$ generated by the solenoid-controlled pressure limiting valve 54 or other transducer. This data may be stored in, or is otherwise accessible to, the controller 102 or pump controller CPU and may be provided in a characteristic map or a look up table assigned to the valve 54 and/or the pump MP, for example. In other embodiments it may be a voltage of the analogue which is modulated to control the output of the solenoid-controlled pressure limiting valve 54.

The pressure sensors, the one or more controllers 102, 110, and the pump output controller 68 can all be considered as part of a control system for the hydraulic supply system.

Pressure Differential Set in Dependence on the Rate of Increase of Load Pressure Demand LSP In accordance with an embodiment, the tractor controller 102 is programmed and configured to control adjustment of the output of the main pump MP in dependence not only on the value of the sensed load sensing pressure LSP but also in dependence on the rate of change of an increasing load sensing pressure demand LSP (referred to as the LSP pressure gradient).

In accordance with a suitable algorithm, the tractor controller 102 determines the LSP pressure gradient of a highest of the load sensing pressure signals LSP forwarded to it by the various pressure sensors in the E-LS network. If the LSP pressure gradient is below a threshold value Tr, the controller 102 regulates the main pump output so that the supply pressure PSP is maintained above the load sensing pressure LSP by a first differential. In an embodiment, the first differential is the stand-by or static pressure differential $\Delta P_{st}$ defined by the spring 26 in the flow control valve 22' and the tractor controller 102 forwards an electronic pump supply control signal EPSCS to the pressure limiting valve 54 calibrated to generate a hydraulic pump supply control signal HPSCS having a pressure $P_{set}$ that is the same as (or equivalent to) the load demand pressure LSP. The resulting pump supply pressure PSP under this circumstance can be derived from equation 1 where $P_{set}$=LSP so that equation 1 can be re-written as:

$$PSP = \Delta P_{st} + LSP \quad \text{Equation 2}$$

Accordingly, when the rate of change of an increasing consumer load sensing pressure LSP is below the threshold value Tr, the E-LS system operates broadly in the same manner as a conventional E-LS system. However, when the rate of increase of a consumer load sensing pressure LSP is at or above the threshold value Tr, the controller 102 is programmed and configured to regulate the main pump output so that the supply pressure PSP is maintained above the load sensing pressure LSP by a second differential larger than the first pressure differential $\Delta P_{st}$. The second pressure differential can be considered to be made up of the static or stand-by pressure differential $\Delta P_{st}$ regulated by the spring 26 in the flow control valve 22' plus an additional dynamic pressure differential $\Delta P_{dyn}$ which is applied by the controller 102 through the hydraulic pump supply control signal HPSCS generated by the pressure limiting valve 54. In this case, the tractor controller 102 forwards to the pressure limiting valve 54 an electronic pump supply control signal EPSCS calibrated to generate a hydraulic pump supply control signal HPSCS having a pressure $P_{set}$ that is higher than the load demand pressure LSP by the amount of the dynamic pressure differential $\Delta P_{dyn}$, such that $P_{set}$ is equal to the load demand pressure LSP plus the dynamic pressure differential $\Delta P_{dyn}$ ($P_{set}$=LSP+$\Delta P_{dyn}$). Equation 1 in this case can be re-written as:

$$PSP=P_{st}+LSP+\Delta P_{dyn} \quad \text{Equation 3}$$

By providing an increased pressure differential when the rate of increase of the load sensing pressure LSP is at or above a certain threshold Tr, the dynamic response of the system is increased. The dynamic pressure differential $\Delta P_{dyn}$ may be applied for a set time period once it is triggered as discussed below.

In a first example, $\Delta P_{st}$ is set at 20 bar, the threshold value Tr of the LSP pressure gradient is set at 5 bar/50 ms (a pressure increase of 5 bar in 50 ms), and the dynamic pressure differential $\Delta P_{dyn}$ is set at 20 bar.

The following tables compare the dynamic performance of a conventional E-LS system and an E-LS system in accordance with the embodiment described above when a consumer valve is opened to produce a consumer load sensing pressure LSP rapidly increasing to 140 bar. Table 1 below illustrates a typical dynamic response of a conventional E-LS control system in these circumstances.

TABLE 1 pressure differential increased by LSP in accordance with prior art

| | | | PSP = $\Delta P_{st}$ + $P_{set}$ (where $P_{set}$ = LSP) | |
|---|---|---|---|---|
| Cycle | Description | $\Delta P_{st}$ (bar) | LSP at start of cycle (bar) | PSP at end of cycle (bar) |
| 1 | Pump pressure is 20 bar, valve is actuated. $P_{set}$ = 20 bar (LSP) is forwarded to pump controller, pump supply pressure is adjusted to 40 bar | 20 | 20 | 40 |
| 2 | Pump pressure is 40 bar, valve is actuated. $P_{set}$ = 40 bar (LSP) is forwarded to pump controller, pump supply pressure is adjusted to 60 bar | 20 | 40 | 60 |
| 3 | Pump pressure is 60 bar, valve is actuated. $P_{set}$ = 60 bar (LSP) is forwarded to pump controller, pump supply pressure is adjusted to 80 bar | 20 | 60 | 80 |
| 4 | Pump pressure is 80 bar, valve is actuated. $P_{set}$ = 80 bar (LSP) is forwarded to pump controller, pump supply pressure is adjusted to 100 bar | 20 | 80 | 100 |
| 5 | Pump pressure is 100 bar, valve is actuated. $P_{set}$ = 100 bar (LSP) is forwarded to pump controller, pump supply pressure is adjusted to 120 bar | 20 | 100 | 120 |
| 6 | Pump pressure is 120 bar, valve is actuated. $P_{set}$ =120 bar (LSP) is forwarded to pump controller, pump supply pressure is adjusted to 140 bar | 20 | 120 | 140 |
| 7 | Pump pressure is 140 bar, valve is actuated. $P_{set}$ = 140 bar (LSP) is forwarded to pump controller, pump supply pressure is adjusted to 160 bar | 20 | 140 | 160 |

As illustrated in Table 1, at each cycle the pressure Post of hydraulic pump supply control signal HPSCS forwarded to the pump controller is equal to the consumer load sensing pressure signal LSP at that time. In the arrangement illustrated, it takes seven cycles for the system to increase the pump supply pressure PSP to 160 bar as required to maintain the pump supply pressure higher than the final consumer load sensing pressure LSP of 140 bar by the static pressure differential $\Delta P_{st}$ Table 2 below shows the effect of increasing the pressure $P_{set}$ of the hydraulic pump supply control HPSCS to include a dynamic pressure differential $\Delta P_{dyn}$ of 20 bar when the rate of increase of LSP reaches the threshold value Tr of 5 bar/50 ms.

TABLE 2

Pressure differential increased depending on rate of change of LSP

| | | | PSP = $\Delta P_{st}$ + $P_{set}$ (where $P_{set}$ = LSP + $\Delta P_{dyn}$ ) | | |
|---|---|---|---|---|---|
| | | | $P_{set}$ | | |
| Cycle | Description | $\Delta P_{st}$ (bar) | LSP at start of cycle (bar) | $\Delta P_{dyn}$ (bar) | PSP at end of cycle (bar) |
| 1 | Pump pressure is 20 bar, valve is actuated. $P_{set}$ = 20 bar (LSP + $\Delta P_{dyn}$) forwarded to pump controller, pump supply pressure is adjusted to 40 bar | 20 | 20 | 0 (no LSP gradient initially available) | 40 |
| 2 | Pump pressure is 40 bar, valve is actuated. $P_{set}$ = 60 bar (LSP + $\Delta P_{dyn}$) is forwarded to pump controller, pump supply pressure is adjusted to 80 bar | 20 | 40 | 20 (LSP gradient > 5 bar/50 ms) | 80 |

TABLE 2-continued

Pressure differential increased depending on rate of change of LSP $PSP = \Delta P_{st} + P_{set}$ (where $P_{set} = LSP + \Delta P_{dyn}$)

| Cycle | Description | $\Delta P_{st}$ (bar) | $P_{set}$ LSP at start of cycle (bar) | $\Delta P_{dyn}$ (bar) | PSP at end of cycle (bar) |
|---|---|---|---|---|---|
| 3 | Pump pressure is 80 bar, valve is actuated. $P_{set} = 100$ bar (LSP + $\Delta P_{dyn}$) is forwarded to pump controller, pump supply pressure is adjusted to 120 bar | 20 | 80 | 20 (LSP gradient > 5 bar/50 ms) | 120 |
| 4 | Pump pressure is 120 bar, valve is actuated. $P_{set} = 140$ bar (LSP + $\Delta P_{dyn}$) is forwarded to pump controller, pump supply pressure is adjusted to 160 bar | 20 | 120 | 20 (LSP gradient > 5 bar/50 ms) | 160 |

It can be seen from Table 2 that increasing $P_{set}$ to include an additional dynamic pressure differential $\Delta P_{dyn}$ when the rate of increase of the load sensing pressure LSP reaches the threshold Tr, fewer cycles (four in this case) are required to increase the pump supply pressure PSP to 160 bar using the method disclosed. This considerably increases the speed of response of the system in adapting the pump supply pressure PSP to meet a rapidly rising consumer load.

In the above example, once application of a dynamic pressure differential $\Delta P_{dyn}$ has been triggered by the rate of increase of the load sensing pressure reaching the threshold Tr, the dynamic pressure differential $\Delta P_{dyn}$ is applied continuously until the consumer demand is met, that is to say when the pump supply pressure PSP equals the sum of the load sensing pressure LSP, the static pressure differential $\Delta P_{st}$, and the dynamic pressure differential $\Delta P_{dyn}$. However, in an alternative embodiment, the dynamic pressure differential $\Delta P_{dyn}$ is only applied for a limited time period after its application is triggered by the rate of increase of the load sensing pressure LSP reaching the threshold Tr and is then ramped down. The time period over which the dynamic pressure differential $\Delta P_{dyn}$ is applied will be referred to as an application period (AP). Applying a dynamic pressure differential $\Delta P_{dyn}$ for a time limited application period AP has been found to provide a dynamic response to a rapidly increasing load sensing pressure LSP but in a more efficient way than applying a dynamic pressure differential $\Delta P_{dyn}$ continuously. The relatively brief application of a dynamic pressure differential $\Delta P_{dyn}$ gives the pump output supply an initial boost to meet the hydraulic load demand but without over supplying the hydraulic system. The application period AP can be selected to meet system requirements but the applicant has found an application period AP in the range of 50 to 300 ms, or in the range of 80 to 200 ms, or in the range of 90 to 150 ms, or in the region of 100 ms to be effective. The system may be configured to apply a dynamic pressure differential $\Delta P_{dyn}$ for different application periods AP depending on operational requirements, such as for different consumers.

In embodiments in which the dynamic pressure differential $\Delta P_{dyn}$ is applied for a time limited application period AP, the system may also be configured to set a delay period DP following one application of a dynamic pressure differential $\Delta P_{dyn}$ before a subsequent application of a dynamic pressure differential $\Delta P_{dyn}$ is permitted. The application of a delay period DP between applications of dynamic pressure differential $\Delta P_{dyn}$ helps to maintain system stability, reducing the risk that oscillations in a load sensing pressure LSP signal are unduly amplified by the addition of a dynamic pressure differential $\Delta P_{dyn}$. The delay period DP is timed from the point at which a dynamic pressure differential $\Delta P_{dyn}$ is first applied. In other embodiments, the delay period DP is timed from the point at which application of a dynamic pressure differential $\Delta P_{dyn}$ is stopped. Indeed, the delay period DP can be timed from any suitable point in relation to an application of a dynamic pressure differential $\Delta P_{dyn}$. Once the delay period DP has expired, a dynamic pressure differential $\Delta P_{dyn}$ can be applied again for the set application period AP if the operating conditions meet the criteria for application of a dynamic pressure differential $\Delta P_{dyn}$. For example, if at the end of the delay period DP following a one application of a dynamic pressure differential $\Delta P_{dyn}$ the rate of increase of the load sensing pressure LSP is at or above the threshold Tr, the controller 102 will again apply a dynamic pressure differential $\Delta P_{dyn}$ for a further application period AP and a further delay period DP begins. The delay period DP can be selected to meet system requirements but the applicant has found that if the delay period DP is timed from the start of a dynamic pressure differential $\Delta P_{dyn}$ being applied, a delay period DP in the range of 600 to 1400 ms, or in the range of 800 to 1200 ms, or in the region of 1000 ms to be effective. The delay period DP is longer than the application period AP and once a dynamic pressure differential $\Delta P_{dyn}$ has been ramped down, no dynamic pressure differential $\Delta P_{dyn}$ is applied for at least the remainder of the delay period DP. Thus, the delay period DP defines a minimum interval between applications of a dynamic pressure differential $\Delta P_{dyn}$.

In other embodiments, once application of a dynamic pressure differential $\Delta P_{dyn}$ is triggered by the rate of increase of the load sensing pressure LSP reaching the threshold Tr, the dynamic pressure differential $\Delta P_{dyn}$ is applied continuously until the rate of rate of increase of the load sensing pressure LSP falls below a threshold value Tr*. This threshold value Tr* may be the same as the threshold value Tr which triggers the application of a dynamic pressure differential $\Delta P_{dyn}$ or it may be a different value. Again, the system may apply a delay period DP following one application of a dynamic pressure differential $\Delta P_{dyn}$ before another application is permitted.

A delay period DP between applications of dynamic pressure differential ΔPdyn can be adopted in any of the embodiments disclosed herein.

The performance of the hydraulic supply system will be influenced by the choice of dynamic pressure differential $\Delta P_{dyn}$ and threshold value Tr broadly as follows:

A higher value for the dynamic pressure differential ΔPdyn will increase the system dynamics as it leads to a faster reaction time to change the pump supply pressure PSP once the rate of increase of the consumer load sensing pressure LSP has reached the threshold value. A lower ΔPdyn value would tend to lead to a slower response but perhaps a smoother and less abrupt change in pump supply pressure PSP.

Lowering the threshold value Tr will increase system dynamics as it causes the dynamic pressure differential ΔPdyn to be applied sooner when an increase in load sensing pressure LSP occurs, and a higher threshold will delay application of the dynamic pressure differential ΔPdyn and so reduce the dynamic response of the system.

Increasing the dynamic pressure differential $\Delta P_{dyn}$ and/or lowering the threshold value Tr of the rate of increase of the load sensing pressure LSP can both be used to provide higher system dynamics. However, use of a lower threshold value Tr is dependent on the ability of the system to sense the load sensing pressure to the tolerances required for reliable control with a smaller threshold value Tr. In view of this it is generally preferred to increase the dynamic pressure differential $\Delta P_{dyn}$ in order to increase the dynamic performance of a hydraulic system. However, a lower threshold value Tr can be used to increase system dynamics if the value selected and the system permits reliable operation.

As both the dynamic pressure differential $\Delta P_{dyn}$ and the threshold value Tr of the rate of increase of consumer load sensing pressure LSP influence the dynamic behavior of the pump adjustment based on consumer load sensing pressure LSP, they are collectively referred to as "LS dynamic parameters".

The actual values for the threshold Tr and the dynamic pressure differential $\Delta P_{dyn}$ are selected as appropriate to any given hydraulic system and the person skilled in the art will be able to establish suitable values by, for example, trial and error. However, in trials with a typical hydraulic supply system on a tractor having a pump MP with a maximum delivery rate of about 229.5 l/min at an engine speed of 2700 RPM and a maximum pump supply pressure of about 230 bar, the applicant has found that a dynamic pressure differential $\Delta P_{dyn}$ in the range of 10 bar to 40 bar and a threshold value Tr in the range of 4 to 10 bar/50 ms are generally suitable. Values outside of these ranges though might also be applicable in some hydraulic systems.

Values for the LS dynamic parameters may be stored in the memory 106 of the tractor controller 102 or be otherwise accessible to the electronic processor 104. LS dynamic parameters may be provided as a default setting permanently saved to the memory 106 or the system may be configured so the values of the LS dynamic parameters can be set or modified via a user interface, such as the touch screen. This would enable the parameters to be input or adjusted by a driver or other user. If the LS dynamic parameters can be input or modified, this would enable a driver to set the LS dynamic parameters to provide a suitable dynamic performance for a particular job or task and/or enable different values for the parameters to be used for different implements. For example, use of a particular implement may be improved by a more dynamic response whereas a different type of implement may be better suited to a less dynamic response. The ability to vary the value of one or more of the LS dynamic parameters enables the driver to adapt the hydraulic supply system accordingly. In a further alternative, instead of entering respective values for the threshold Tr and/or the dynamic pressure differential $\Delta P_{dyn}$, the system may be configured to operate in different LS modes which may be optionally selected by a user. The system could, for example, be configured to be operable in a "dynamic mode" or an "efficiency mode", with the values of the LS dynamic parameters being set to provide a faster response to increases in consumer load sensing pressure LSP in the dynamic mode and to provide a slower response time in efficiency mode to reduce power consumption. The system may be further configured to enable selection of a "balanced mode" with the values of the LS dynamic parameters set in-between the dynamic and efficiency modes. The use of predefined, selectable modes require less skill and experience by the driver while still providing an ability to customize the hydraulic supply system settings.

In a further optional refinement, the method may utilize more than one threshold value Tr for the rate of increase of load sensing pressure LSP and more than one dynamic pressure differential $\Delta P_{dyn}$ so as to enable a stepped ramp up of the dynamic pressure differential $\Delta P_{dyn}$ depending on the rate of increase of the load sensing pressure LSP. Accordingly, in an embodiment the system may configured to apply a first dynamic pressure differential $\Delta p1_{dyn}$, for example 20 bar, when the rate of increase of the load sensing pressure LSP is at or above a first threshold value Tr1 but below a second threshold value Tr2, and to apply a higher, second dynamic pressure differential $\Delta P2_{dyn}$, for example 40 bar, when the rate of increase of the load sensing pressure LSP is at or above the second threshold value Tr2. For example, a first threshold value Tr1 could be set at 5 bar/50 ms and a second threshold value Tr2 set at 10 bar/50 ms. It will be appreciated that the values for Tr1, Tr2, $\Delta P1_{dyn}$, and $\Delta P2_{dyn}$ mentioned above are illustrative only and that the values used can be selected as desired to suit any particular hydraulic supply system and performance requirements. It should also be appreciated that more than two different dynamic pressure differentials can be utilized and implemented at suitable threshold values for the rate of increase of the load sensing pressure.

In a yet still further optional refinement, different settings for the LS dynamic parameters are adopted depending on the value of the load sensing pressure LSP. For example, a first dynamic pressure differential $\Delta P1_{dyn}$ and/or threshold value Tr1 for the LSP pressure gradient is/are applied when the load sensing pressure LSP is below a first threshold pressure TP1 and a second dynamic pressure differential $\Delta P2_{dyn}$ and/or threshold value Tr2 for the LSP pressure gradient is/are applied if the load sensing pressure LSP is equal to or above the first threshold pressure TP1. In an embodiment, the LS dynamic parameters may be selected to provide a less dynamic response at higher load sensing pressures. Thus the LS dynamic parameters can be set to provide a fast reaction initially (e.g. to overcome internal inertia in the pump controller when starting to pivot the pump) but then provide a smoother control of the pump supply pressure as the dynamic behavior of the pump increases. This also provides a tiered dynamic response, and it will be appreciated that more than two ranges of load sensing pressure LSP in which different LS dynamic parameters are adopted can be defined. In one example, different LS dynamic parameters are applied in two ranges:

Range 1: a first dynamic pressure differential $\Delta P1_{dyn}$, such as 10-20 bar, is applied when the rate of increase of the load sensing pressure is at or above a threshold value Tr1 of 7 bar/50 ms and the load sensing pressure LSP is below a first pressure threshold TP1, such as 40-45 bar.

Range 2: a second dynamic pressure differential $\Delta P2_{dyn}$, such as 5-10 bar, is applied when the rate of increase of the load sensing pressure is at or above a second threshold value Tr2 of 5 bar/50 ms and the load sensing pressure LSP at or above the first pressure threshold TP1, such as 40-45 bar.

It will be noted that the threshold value Tr1 of the rate of increase of the load sensing pressure is slightly higher in the first range than the second range. The means that the system will wait for a higher increase per time of the load sensing pressure LSP before applying the first dynamic pressure differential $\Delta P1_{dyn}$. Nevertheless, since the dynamic pressure differential $\Delta P1_{dyn}$ applied in the first range is significantly higher than that applied in the second range, the dynamic response is higher overall in the first range than the second. In tests it has been found that the control system is less prone to oscillation by applying a slightly higher threshold value Tr initially. However, there may be circumstances in which the threshold Tr for the load sensing pressure LSP gradient is the same in all LSP pressure ranges or if a lower threshold Tr is used for a range in which the LSP pressure is lower than in a later range in which the LSP pressure is higher.

Additional ranges could be added with a second, a third or more threshold pressures TP2, TP3, . . . . TPn with a different dynamic pressure differentials $\Delta P23_{dyn}$, $\Delta P4_{dyn}$, . . . . $\Delta Pn_{dyn}$ and/or threshold value(s) Tr for the LSP pressure gradient being applied in each range.

In one embodiment, no dynamic pressure differential $\Delta P_{dyn}$ is applied once the LSP reaches a threshold pressure TP. Thus, in the above example, in a third range in which the LSP pressure is at or above a threshold value TP2 of 70 bar, no dynamic pressure differential $\Delta P_{dyn}$ is applied regardless of the rate of increase of the load sensing pressure LSP.

The actual values for the dynamic pressure differential(s) $\Delta P1_{dyn}$, $\Delta P2_{dyn}$, the threshold value(s) Tr for the LSP pressure gradient, and threshold pressure(s) TP can be selected to meet system requirements and are not limited to the above examples.

In an embodiment, the controller 102 is configured to require that the conditions for a particular range are met for a set period of time, referred to as a range delay period RDP, before a dynamic pressure differential $\Delta P_{dyn}$ for that range is applied. The range delay period RDP may be in the region of 150 to 450 ms, or in the range of 200 to 400 ms, or in the range of 250 to 350 ms, for example. Thus if the system is operating in range 1 and the load sensing pressure LSP increases to or above the threshold value TP1 indicating a change to range 2, the controller 102 waits for the range delay period RDP to expire before the dynamic pressure differential $\Delta P2_{dyn}$ for range 2 can be applied. During this time delay, no dynamic pressure differential $\Delta P_{dyn}$ is applied to control the output of the pump. If after expiry of the range delay period RDP the conditions for range 2 are still met, the dynamic pressure differential $\Delta P2_{dyn}$ for range 2 is adopted and can be applied if the appropriate threshold Tr2 for the load sensing pressure LSP gradient in that range is met. However, if during the range delay period RDP the load sensing pressure LSP indicates a further change of range, such as back to range 1, a further range delay period RDP is applied from the moment the new range is triggered before the dynamic pressure differential $\Delta P1_{dyn}$ for the new range can be applied.

If the system is configured to apply a dynamic pressure differential $\Delta P_{dyn}$ for a limited application period $\Delta P$ when triggered and to apply a minimum delay period DP between applications of a dynamic pressure differential $\Delta P_{dyn}$, the system can be configured to apply both a minimum delay period DP and a range delay period RDP. In this case, the controller 102 may be configured to apply the delay period DP and the range delay period RDP concurrently should a change of range occur while a delay period DP is still running following an earlier application of dynamic pressure differential $\Delta P_{dyn}$ in the previous range. Typically, the delay period DP will be longer than the range delay period RDP.

To further clarify concurrent running of the delay period DP the range delay period RDP, two examples are considered in which the delay period DP is set to 1000 ms and the range delay period RDP is set to 300 ms. In the examples, a change from range 2 to range 1 takes place after the dynamic pressure differential $\Delta P2_{dyn}$ for range 2 has been applied but before the end of the delay period DP triggered by that application.

In a first example, the change of range takes place 600 ms after the delay period DP began. In this case, the range delay period RDP ends 900 ms after the delay period DP had begun. Accordingly, when the delay period DP expires after 1000 ms, the LS dynamic parameters for range 1 are adopted and the dynamic pressure differential $\Delta P1_{dyn}$ for range 1 can be applied, provided the conditions for range 1 are still met and the rate of increase of the load sensing pressure is at or above the threshold value Tr1 for range 1 at the time. If the dynamic pressure differential $\Delta P1_{dyn}$ is subsequently applied, this will be applied for the application period AP and a further delay period DP is commenced.

In a second example, the change in range takes place 800 ms after the delay period DP has begun. In this case, the delay period DP expires 100 ms before the end of the range delay period RDP. Accordingly, application of the LS dynamic parameters for range 1 is delayed for a further 100 ms after the end of the delay period DP. After the range delay period RDP has expired (1100 ms after the previous application of dynamic pressure differential $\Delta P2_{dyn}$ when the system was operating in range 2) the dynamic pressure differential $\Delta P1_{dyn}$ for range 1 can be applied, provided the conditions for range 1 are still met and the rate of increase of the load sensing pressure is at or above the threshold value Tr1 for range 1 at the time. If the dynamic pressure differential $\Delta P1_{dyn}$ is applied, this will be applied for the application period $\Delta P$ and a further delay period DP is commenced.

Should a change of range occur during the application period $\Delta P$, the controller continues to apply the dynamic pressure differential $\Delta P_{dyn}$ until the end of the application period $\Delta P$. The controller will also concurrently apply the delay period DP and the range delay period RDP before any further dynamic pressure differential $\Delta P_{dyn}$ is applied.

Use of the delay periods in this way helps to maintain system stability when changing between ranges and smooths reaction when a range is maintained.

It is expected that varying the LS dynamic parameters in discreet ranges of load sensing pressure LSP will offer smoother control with less risk of oscillation. However, in some systems, the LS dynamic parameters may be varied in proportion (e.g. a linear or other mathematical relationship) to the value of pressure of the load sensing pressure LSP, at least over a certain range of pressures.

Automatic Adaptation of LS Dynamic Parameters

In an embodiment, the controller 102 is programmed to use one or more algorithms to adapt the LS dynamic parameter settings automatically. In such an arrangement, target values may be defined for at least one operational target or parameter. Examples of operational targets might include a desired time limit by which a certain pump supply pressure PSP is achieved depending on the sensed load sensing pressure demand LSP. The controller may be enabled to permanently adapt the LS dynamic parameter settings for a given consumer. For example, if for a particular consumer the ideal value is to adjust the pump supply pressure PSP to match a load sensing pressure such as 100 bar within 200 ms, the system measures the change in pump supply pressure PSP values against time and adapts the LS dynamic parameter settings (e.g. increases the dynamic pressure differential $\Delta P_{dyn}$) to enable the target to be met. The adapted settings may be stored, such as in a lookup table, in a memory accessible to the controller from which they can be subsequent recalled and/or applied in respect of that consumer and/or under certain operating conditions.

Thus, in a self-learning system, the controller may compare the set value of the pump supply pressure PSP and the response of the LS system to adjust LS dynamic parameter settings. The controller may be programmed to apply a time limit for meeting the set pump supply pressure PSP. If the time limit is exceeded, the controller changes the LS dynamic parameters to a more dynamic setting (e.g. by increasing the dynamic pressure differential $\Delta P_{dyn}$). This may be an iterative process and the settings derived can be stored in memory for a particular combination of tractor and implement for subsequent use when that particular tractor/implement combination is detected or input by a user. The controller 102 may be configured to update a model used to control the pump supply pressure with LS dynamic parameter settings derived during runtime.

In an embodiment, the system is additionally or alternatively configured to take into consideration actuation of a consumer UI to adapt the LS dynamic parameter settings for the consumer assigned to that UI. If the UI is operated in a manner that demands a faster or greater actuation of the consumer, then the controller 102 may apply a more dynamic setting for the LS dynamic parameters (e.g. a higher dynamic pressure differential $\Delta P_{dyn}$) than if a slower or smaller actuation is requested. If the UI is a rocker switch for example, the degree and/or speed of movement of the rocker may be monitored to determine the speed and size of the requested actuation. For example, faster movement of the rocker may be indicative that a faster actuation is requested. Alternatively, the output signal from the UI may be analyzed to determine the size and speed of the requested actuation. By recording a UI input (in terms of deviation or actuating speed), the system can be enabled to recognize a similar UI input and apply suitable LS dynamic parameters as previously determined.

Additional Electronic Stand-By Pressure Differential

In the embodiments described above, the stand-by pressure differential $\Delta P_{st}$ is wholly set hydro-mechanically by the spring 26 in the flow control valve 22' and can be designated as a mechanical stand-by pressure differential M–$\Delta p_{st}$. This mechanical stand-by pressure differential M–$\Delta p_{st}$ is applied at all times when the pump is being driven, including while the engine is being started.

In a further embodiment, the E-LS system is configured to apply an additional hydro-electronically defined stand-by pressure differential E–$\Delta P_{st}$ to increase the overall stand-by pressure differential $\Delta p_{st}$. This can be designated as an electronic stand-by pressure differential E–$\Delta P_{st}$. In order to produce the electronic stand-by pressure differential E–$\Delta p_{st}$, the controller 102 sends an electronic pump supply control signal to the pressure limiting valve 54 to generate a hydraulic pump supply control signal HPSCS having a pressure $P_{set}$ at the LS port 34 of the flow control valve 22' which causes the pump supply pressure to be raised at least by the amount of the E–$\Delta P_{st}$.

The controller 102 may be configured to apply the electronic stand-by pressure differential E–$\Delta P_{st}$ at all times even when there is no load sensing pressure LSP. Thus, when the pump is running but there is no load sensing pressure detected, $P_{set}$ will be equal to the electronic stand-by pressure differential E–$\Delta P_{st}$. The resulting pump supply pressure PSP can be calculated by equation 4:

$$PSP = M-\Delta p_{st} + E-\Delta P_{st} \qquad \text{Equation 4}$$

where M–$\Delta P_{st}$ is the mechanically defined stand-by pressure differential defined by the spring 26 in the flow control valve 22', and E–$\Delta P_{st}$ is the electronically defined stand-by pressure differential.

When a load sensing pressure LSP arises and is forwarded to the controller 102, the controller will increase $P_{set}$ to include the electronically defined stand-by pressure differential E–$\Delta p_{st}$, the load sensing pressure LSP, and any dynamic pressure differential $\Delta p_{dyn}$ as appropriate depending on the rate of increase of the load sensing pressure LSP as described above. The resulting pump supply pressure PSP can be calculated by equation 5:

$$PSP = -\Delta p_{st} + E-\Delta P_{st} + LSP + \Delta P_{dyn} \qquad \text{Equation 5}$$

where M–$\Delta P_{st}$ is the mechanically defined stand-by pressure differential defined by the spring 26 in the flow control valve 22', E–$\Delta p_{st}$ is the electronically defined pressure differential, LSP is the load sensing pressure forwarded from a consumer, and $\Delta P_{dyn}$ is the dynamic pressure differential applicable depending on the rate of increase of the LSP.

The electronic stand-by pressure differential E–$\Delta P_{st}$ is applied to raise the overall stand-by pressure differential and could be applied whenever the engine is running or in response to an LSP from one or more consumers. In an embodiment, an electronic stand-by pressure differential E–$\Delta P_{st}$ is applied when a load sensing pressure LSP from a consumer on an attached implement is detected in order to compensate for losses in the system due to the length of the hydraulic lines but is not dependent on the rate of change of the LSP.

In an embodiment, the controller 102 is configured to apply the electronic stand-by pressure differential E–$\Delta P_{st}$ only once the engine of the tractor is determined to be running normally but not during engine start up. In an embodiment, the controller 102 is configured to apply the electronically defined stand-by pressure differential E–$\Delta P_{st}$ once a condition, or a set of conditions, is/are met which indicate that the engine has started and is running properly. In an embodiment, the controller 102 is configured to apply the electronic stand-by pressure differential E–$\Delta P_{st}$ once the engine RPM exceeds a set speed for a set period of time, such as 400 R/min for more than 4 seconds for example.

Event Based Pump Supply Control

LS based adjustment of the pump supply is inherently reactive as the pump supply is only increased once a load sensing pressure LSP, or an increase in a load sensing pressure, has occurred, been detected by the E-LS system, and the pump supply adjusted. However, there are circumstances in which an increased hydraulic demand can be predicted before an increase in load sensing pressure LSP occurs and even before a particular consumer is actuated.

In some embodiments, the pump supply output is adjusted when a determination is made that one or more consumers is/are to be actuated or that a predefined operational sequence which involves actuation of at least one of the consumers and is known to give rise to an increased hydraulic demand is about to commence or has commenced.

Operative parameters on the tractor and/or an attached implement are monitored to recognize operational sequences which are known to give rise to an increased hydraulic demand from a consumer or consumers and the pump supply output, especially the pump supply pressure, is adjusted to meet the expected increase in demand when commencement of a particular operational sequence is detected or predicted. This takes advantage of the fact that if an electronic load sensing system is present, the system can be configured to adjust the pump supply output predictively not just in response to a load sensing pressure LSP.

In this context, it should be understood that terms such as "predictively" and "predictive mode" used in relation to adjustment of the pump supply refer to the fact that the pump supply pressure is adjusted, usually increased, before a hydraulic load demand has actually arisen or at least prior to one being sensed by the E-LS system.

Predictive pump supply adjustment can be applied to operational sequences or processes carried out by a tractor 60, or by an implement 62 attached to the tractor 60, or that are carried out jointly on a tractor and an attached implement.

Often an implement attached to a tractor will undertake a series of operations in a predictable sequence, an operational sequence, which gives rise to an increased hydraulic demand. If the occurrence of a first event (such as actuation of a particular hydraulic actuator or some other detectable event) is known to precede a given operational sequence, occurrence of the first event can be used to trigger adjustment of the pump supply output ready to meet the expected demand before a consumer associated with the operational sequence is actuated. This enables the system to operate in a highly dynamic way without overly compromising on efficiency. Such a first event may be defined as a trigger event.

In an example in which the implement comprises a baler/wrapper combination, when a bale is ready to be transferred to the wrapper, subsequent opening of the bale chamber door and wrapping of the bale will often result in higher demand from the corresponding hydraulic drives. The controller 102 is configured to adjust the pump supply to ensure the system can meet the predicted higher demand when the system detects that a bale is ready, or nearly ready, to be transferred. This helps the hydraulic supply system to achieve an appropriately dynamic response as the bale chamber door is opened and/or the wrapping processes commences. This embodiment will be described in further detail with reference to FIGS. 6 to 8.

Figure 6:
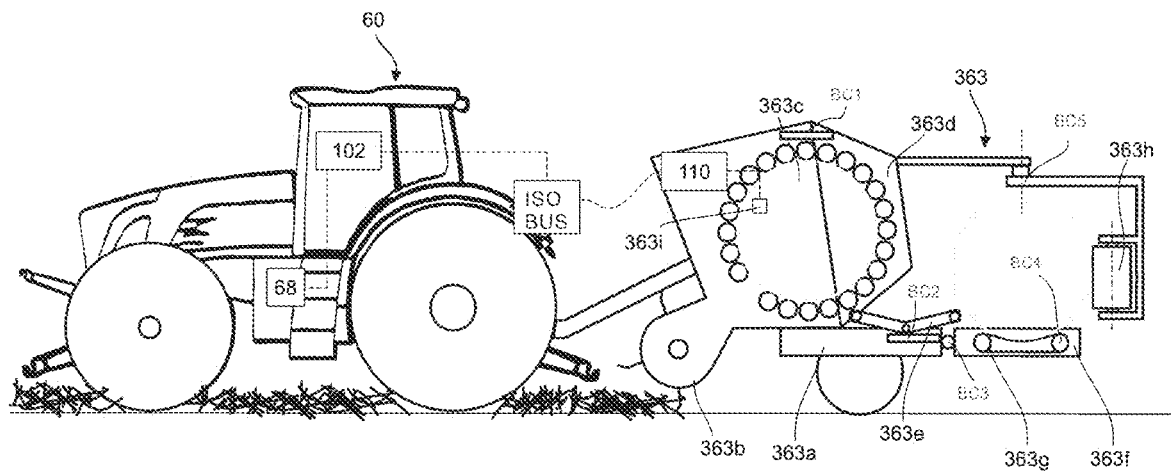
FIG. 6 is a schematic side view of an agricultural machine and implement combination.

FIG. 6 illustrates schematically a rear implement in the form of round baler and wrapper combination 363.

The baler/wrapper combination 363 consists of the following main components whereby reference is taken also to the hydraulic supply system as shown in FIG. 5 and described above;

A chassis 363a including ground wheels supporting the crop processing equipment.

A pick-up 363b to collect a crop swath, e.g. straw or grass, from the field. The pick-up 363b is driven via a PTO from the tractor (not shown).

A bale chamber 363c in which a round bale is formed and which includes a net binding device (not shown) to bind a net around the bale circumference after forming the bale to keep the bale together. The bale chamber 363c has rollers driven by via the PTO (not shown).

A bale chamber door (rear door) 363d which is driven by a linear hydraulic motor indicated as baler consumer BC1.

A bale transfer device 363e which is a swaying support with a linear hydraulic drive (indicated as baler consumer BC2) which moves the bale in a rearward direction.

A wrapper table 363f to support the bale during a wrapping process. The wrapper table is rotatably mounted to the chassis 363a and can be pivoted by a hydraulic drive indicated as baler consumer BC3 to lay the bale down smoothly on the field.

A bale rotator 363g assembled on the wrapper table 363f to slowly rotate the bale about an axis which is horizontal and transverse relative to the driving direction. Bale rotator 363g is driven by rotary hydraulic drive indicated as baler consumer BC4.

A wrapping arm 363h which rotates around the bale in a vertical axis to wrap a foil fed from a foil roll (not shown) around the bale. Wrapping arm 363h is driven by rotary hydraulic drive indicated as baler consumer BC5.

The baler/wrapper combination 363 is provided with further components to provide the full functionality but the focus is directed on those components which are relevant for the hydraulic supply system. Further details of a baler/wrapper can be seen in European Patent Publication 1266563 A1, Roundbaler for Agricultural Stock Material, published Dec. 18, 2002.

Regarding the hydraulic drive system on the baler, the baler consumers BC1, BC2, BC3, BC4 and BC5 are hydraulic drives which may be supplied by hydraulic valves of the rear manifold RVM (indicated as RMV3, .... RMV5 in FIG. 5) so that e.g. hydraulic drive BC1 corresponds with RIC1. Alternatively, the hydraulic drives BC1, BC2, BC3, BC4 and BC5 may be supplied by a valve manifold on the implement (indicated as TVM in FIG. 5) which is connected to the main pump MP of the hydraulic supply system 64 via power beyond and the power beyond interface 70. In this case, hydraulic drive BC1 may correspond with RIC4.

In view of the number of consumers on the baler/wrapper 363, the rear valve manifold RMV or the implement valve manifold TMV will require additional valves to those shown in FIG. 5 to correspond to the number of consumers on the baler/wrapper combination 363.

Regarding the electronic network, the implement controller 110 may serve to control the implement valve manifold IVM but also process sensor information, e.g. from a bale size detection means 363i which determines the size of the bale for comparison with a target bale size value. The bale size detection means 363i is mainly used in the art to determine when a bale is completed and is ready to be discharged from the bale chamber 363c. Further sensing means may be provided to detect positions of a bale within the process, determine positions/status of the hydraulic consumers BC1 to BC5 and/or the status of the process steps involved. These are not described in detail. The implement controller 110 may be in communication with the tractor controller 102 via a standardized ISOBUS.

Figure 7:
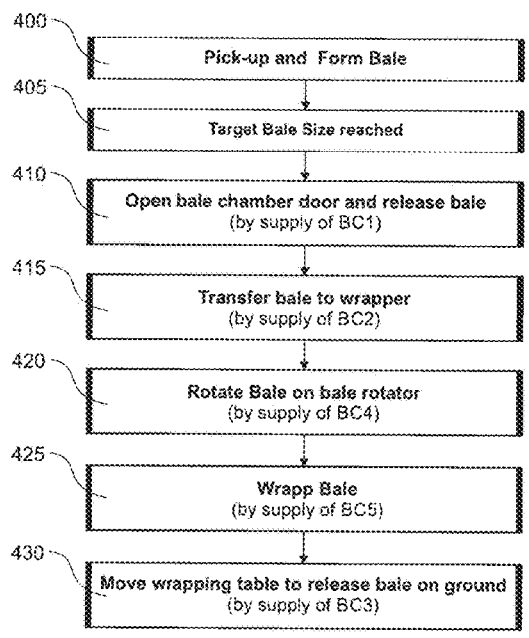
FIG. 7 is a flow chart depicting an operational sequence according to the prior art.

An operational sequence for the combined baler/wrapper according to the prior art is depicted in a flow chart in FIG. 7 with the following steps:

At step 400 crop is picked up and formed into a bale in the bale chamber.

At step 405 the bale size detection means 363i determines that the bale size has reached the target value.

At step 410 the bale chamber door 363*d* is opened by baler consumer BC1 to release the bale form the bale chamber 363*c* and drop the bale on the bale transfer device 363*e*.

At step 415 the bale is then transferred to the wrapping table by baler consumer BC2 operating bale transfer device 363*e*.

At step 420 the bale rotator 363*g* is rotated the bale about a horizontal transverse axle (in driving direction) driven by baler consumer BC4.

At step 425 the wrapping arm 363*h* rotates around the bale in a vertical axis driven by baler consumer BC5 to wrap a foil coming from a foil roll (not shown) around the bale. A sensing means not shown may determine competition of the wrapping process.

At step 430, after wrapping process is finished, the wrapper table 363*f* is pivoted by baler consumer BC3 to lay down the bale smoothly on the field.

Figure 8:
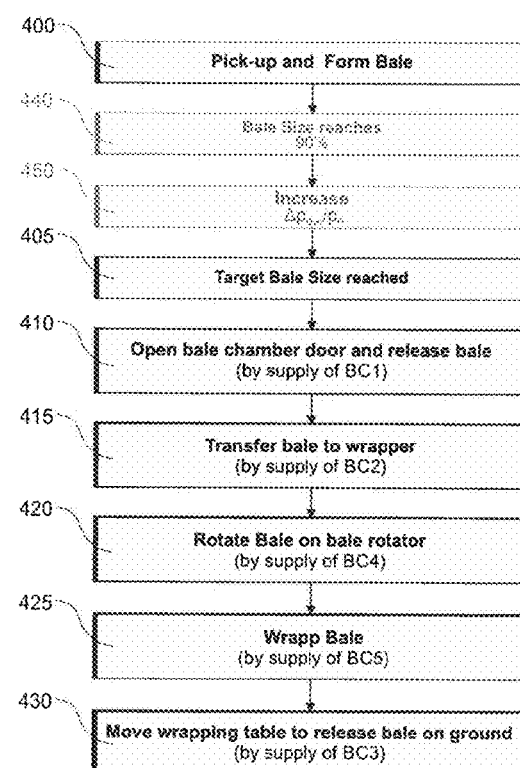
FIG. 8 is a flow chart depicting an operational sequence.

The steps described above may also involve further sensors to determine when a step starts or ends, e.g. sensing means may determine when the bale is at transfer position, but this is not described in detail or included in the operational sequences as depicted in FIGS. 7 and 8.

In the operational sequence according to the prior art, the hydraulic demand is quite constant during pick-up and formation of the bale as the pick-up 363*b* and the bale chamber 363*c* are driven via the PTO rather than the hydraulic supply system 64. However, when the bale is released from the bale chamber and processed further, the hydraulic baler consumers BC1 to BC5 require increased hydraulic supply. This results in an increase of the load sensing pressure signal LSP which triggers a pump adjustment to increase the pump supply pressure PSP. With the known E-LS systems, there is a delay between the load sensing pressure LSP increasing and the subsequent increase in the hydraulic supply which affects the operation time for the overall process. As a consequence, it is often necessary to stop the tractor 60 before a further is processed.

To mitigate this problem, the operational sequence is adapted according to an embodiment as depicted in FIG. 8. While the steps 400, 405, 410, 415, 420, 425, 430 remain the same as already described in FIG. 7, additional steps 440 and 450 are added prior to step 405.

During step 400 the implement controller 110 monitors bale size by using the information retrieved with bale size detection means 363*i*. At step 440 the controller determines that a triggering event has occurred when the bale size reaches a certain value, such as 90% of the target value. This provides an indication that the hydraulic demand will shortly increase to carry out steps 410, 415, 420, 425 and 430. At step 450 and in response to the triggering event, the implement controller 110 sends a signal to the tractor controller 102 to adjust the pump supply control to a higher output by means of pump output controller 68. This may happen in two different ways:

1. The pump pressure PSP is set to a predetermined value. This must be seen as a predictive adjustment in which the pump supply pressure is initially raised without reference to the load sensing pressure. The control system may revert to a load sensing mode of control in which the pump supply is regulated in dependence on a load sensing pressure signal LSP after a predetermined time period or based on any other parameter indicating that the hydraulic supply is sufficient to meet the hydraulic demands of the event or sequence.
2. Alternatively, if the control system is configured to regulate the pump supply based on the rate of increase of a load sensing pressure LSP as described above, the tractor controller may be configured in response to a trigger event to adopt values of the LS dynamic parameters (the dynamic pressure differential $\Delta P_{dyn}$ and/or the threshold value Tr of the rate of increase of consumer load sensing pressure LSP) which provide a faster more dynamic response to the consumer demand coming via the load sensing system LS.

If the predictive adjustment of option 1 is adopted, the hydraulic supply will already have been increased to meet the predicted hydraulic demand of consumer BC1 at step 410 and for consumers BC2 to BC5 in the subsequent steps. If option 2 is adopted, the pump supply control will react more quickly to an increase in the load sensing pressure LSP generated at step 410 by actuation of consumer BC1. Either option will result in a reduced operation time for the overall process and more efficiency in the baling/wrapping process.

As the steps described above may also involve further sensors to determine if a step starts or ends, e.g. sensing means may determine when the bale is at transfer position, the increase of the pump supply as depicted in step 450 may be triggered by other events determined via sensors which are not shown.

A further example relates to the pick-up of a round baler. When the pickup is lifted, this indicates an inoperative condition. If the driver lowers the pickup into the swath, this may not require higher hydraulic demand (or raise the load sensing pressure signal LSP) as the pickup may be lowered by gravity. However, the control system may recognize that the next step will be to activate the bale processing equipment (baler belt drive) which will result in a higher demand and pre-emptively adjusts the pump supply pressure PSP or adopts more dynamic LS to a suitable value for the process or modifies the LS dynamic parameters to provide for a more dynamic response to the LSP increasing when the bale processing equipment is actuated.

As described above in relation to the combined round baler/wrapper 363, in embodiments in which the implement 62 has a controller 110, the implement controller 110 can be configured to determine when a particular operational sequence has been, or is about to be, initiated on the implement and to forward a signal to the tractor controller 102 to raise the pump supply pressure or modify the LS dynamic parameters. Data enabling the tractor controller to select a suitable value to which the pump supply pressure PSP should be raised or appropriate LS dynamic parameters may be forwarded from the implement controller 110 to the tractor controller 102. Alternatively, the implement controller 110 may forward a signal to the tractor controller indicative that a particular trigger event has occurred and the tractor controller 102 be programmed in response to retrieve a suitable set point value for the pump supply pressure PSP and/or LS dynamic parameters associated with that event saved in memory accessible by the tractor controller, such as in a look-up table or characteristic map or the like. In a further alternative, the tractor controller may be programmed to raise the pump supply pressure to a set value (such as the max system pressure) when it receives a signal from the implement controller 110 indicative that a trigger event has occurred.

An example relating to consumers on the tractor 60 arises when a hydraulic damping function for the tractor linkage is activated when the tractor is to be driven on a road. This may require the pump supply pressure to be raised or more dynamic LS dynamic parameters adopted to enable dynamic damping on the road. In this case, activation of the damping function is a trigger event which the tractor controller 102 is programmed to respond to by predictively increasing the pump supply pressure PSP and/or selecting suitable LS dynamic parameters.

For reasons of economy, it is not desirable to maintain a high pump supply pressure PSP unnecessarily. Accordingly, the control system will typically be arranged to revert to a load-sensing-based control of the pump supply output following a predictive adjustment.

In an embodiment, the tractor controller is programmed to revert to a load-sensing-based control of the pump supply output after a set time limit following a trigger event being detected or following a predictive adjustment of the pump supply. This may be a default time limit applied in all cases or different time limits can be applied for different operational sequences which trigger a predictive adjustment. It may be appropriate for an increased pump supply pressure to be maintained for longer in respect of some operational sequences than others and the control system can be programmed to take this into account.

In an alternative embodiment, the tractor controller is programmed to revert to a load-sensing-based control of the pump supply output when a certain operational parameter is met. This might be confirmation, such as from a sensor, that a particular operational sequence has been completed. Alternatively, the controller may monitor the pump supply pressure PSP, such as using data provided by the pressure sensor 132, and be programmed to revert to a load sensing mode of control of the pump supply if the pump supply pressure PSP is higher than the expected peak demand of the operational sequence and higher than the highest load sensing pressure LSP being reported at the time. This indicates that the pump supply is able to meet the hydraulic demand of the operational sequence and that it is appropriate to recommence control of the pump supply based on load sensing.

This program can be adopted in hydraulic supply systems having an electronic load sensing system E-LS which is not configured to adjust the pump supply pressure PSP in dependence on the rate of increase of the load sensing pressure or not. In this case, the system will be configured to make a predictive adjustment of the pump supply pressure as set out in option 1 above in response to a trigger event. If the E-LS system is configured to adjust the pump supply pressure PSP in dependence on the rate of change of the load sensing pressure, the controller 102 may be configured to adopt either of options 1 or 2 as set out above. Regardless of which option is applied, the controller 102 may be configured to apply particular values for the LS dynamic parameters for a given operational sequence in the event that load sensing control of the pump supply is reinstated part way through the operational sequence. It may be appropriate to use more dynamic settings of the LS dynamic parameters for a particular operational sequence than would usually be applied for the respective consumer or consumers when actuated outside of the operational sequence.

A trigger event or commencement of a particular operational sequence requiring a predictive pump supply adjustment can be detected in a wide range of ways. One or more sensors may be used to detect operational parameters indicative of a trigger event. For example, in the case of the baler/wrapper example discussed above, a sensor may be provided to detect when a bale is ready to be transferred. Alternatively, a camera-based system may be used to monitor events which precede an operational sequence. In other circumstances, actuation of one or more consumers and/or other actuators, such as in a particular sequence, can be used as a trigger event. Accordingly, the tractor controller may monitor data from various user interfaces and/or valve controllers and be programmed to recognize a given actuation or sequence of actuations as a trigger event.

Event based predictive pump supply adjustment can be combined with self-learning techniques similar to those discussed above in relation to automatic adaptation of LS dynamic parameters.

In an embodiment, the controller 102, is configured to automatically adapt predictive control of the pump supply for a given operational sequence by monitoring one or more operational parameters during execution of the operational sequence to determine if the operational parameter meets an operational target associated with at least one consumer actuated as part of the sequence. This may be an iterative process.

For example, the controller 102 may initially calculate a predicted consumer load for the consumer or consumers which are the be actuated as part of the operational sequence and set the pump supply pressure PSP to a first set point to meet this predicted consumer demand when a predictive adjustment of the pump supply is initiated by a trigger event. During execution of the sequence, the controller monitors the pump supply pressure PSP against the actual load sensing pressure demand. If the controller determines that the pump supply pressure PSP either exceeds or fails to meet the highest actual consumer load sensing pressure LSP reported during the sequence by an amount outside of preset tolerances, the controller may set the highest actual reported load sensing pressure as the predicted load sensing pressure and apply this setting to determine a revised set point for the pump supply pressure when a predictive adjustment of the pump supply is subsequently trigged for the same operational sequence.

Alternatively, the operational target may be a set time limit for response of a particular consumer. Thus, the target may be a set time limit for the consumer to respond to its actuation. Data from one or more sensors arranged to determine response of the consumer is provided to the controller and the controller 102 configured to automatically adjust the set point for the pump supply pressure so as to meet the set time limit using the lowest possible pump supply pressure PSP. If a consumer is an actuator which moves a component, a sensor or sensors may be arranged to detect movement of the component as indicative of the response of the consumer.

The adapted settings may be stored, such as in a lookup table or characteristic map, in a memory accessible to the controller 102 from which they can be subsequently recalled and/or applied in respect of a particular operational sequence. The controller 102 may be configured to update a model used to predictively control the pump supply pressure for an operational sequence when a trigger event is detected with settings derived during runtime.

Figure 1:
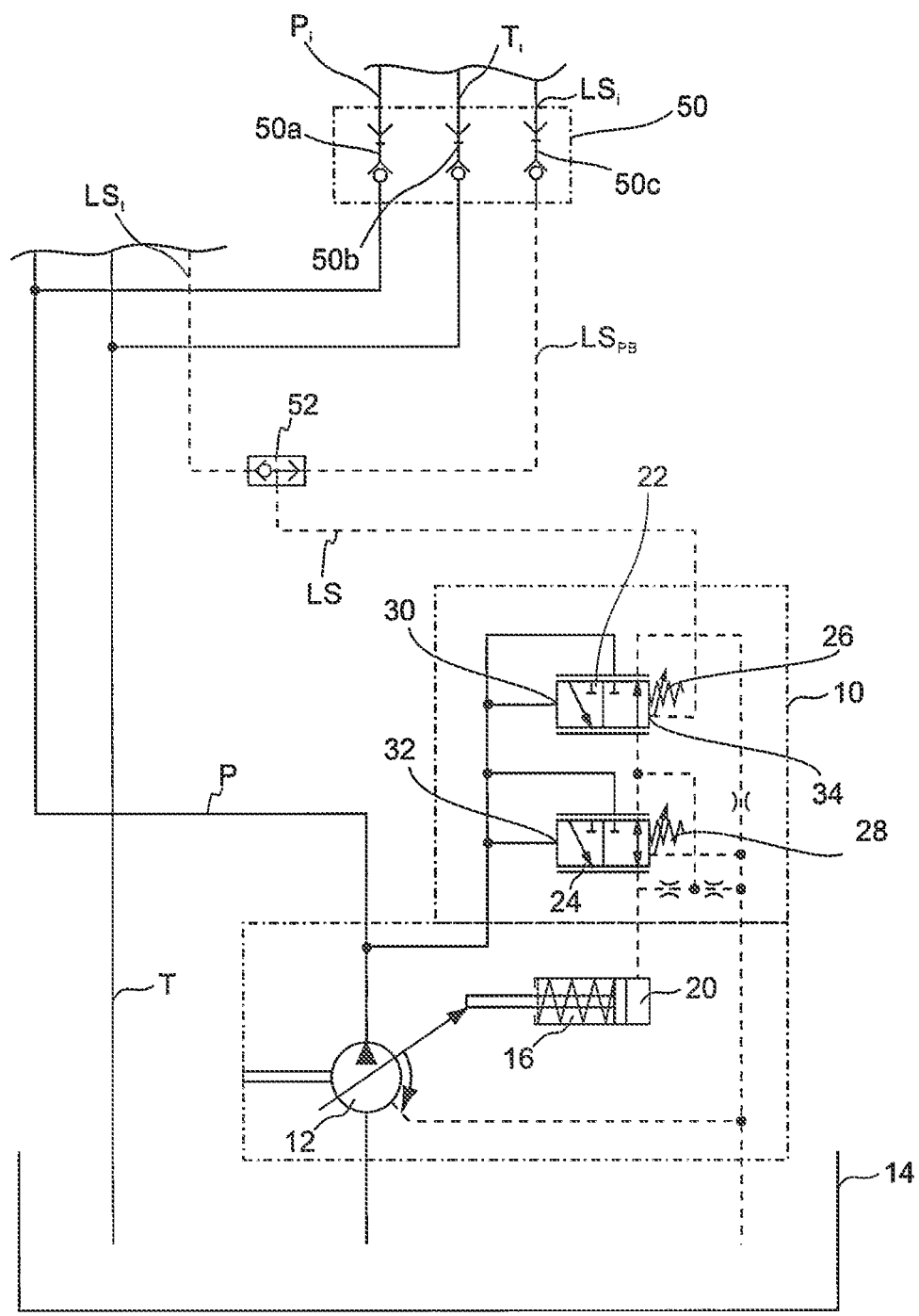
FIG. 1 illustrates part of a simplified known CC-LS hydraulic circuit.
Figure 2:
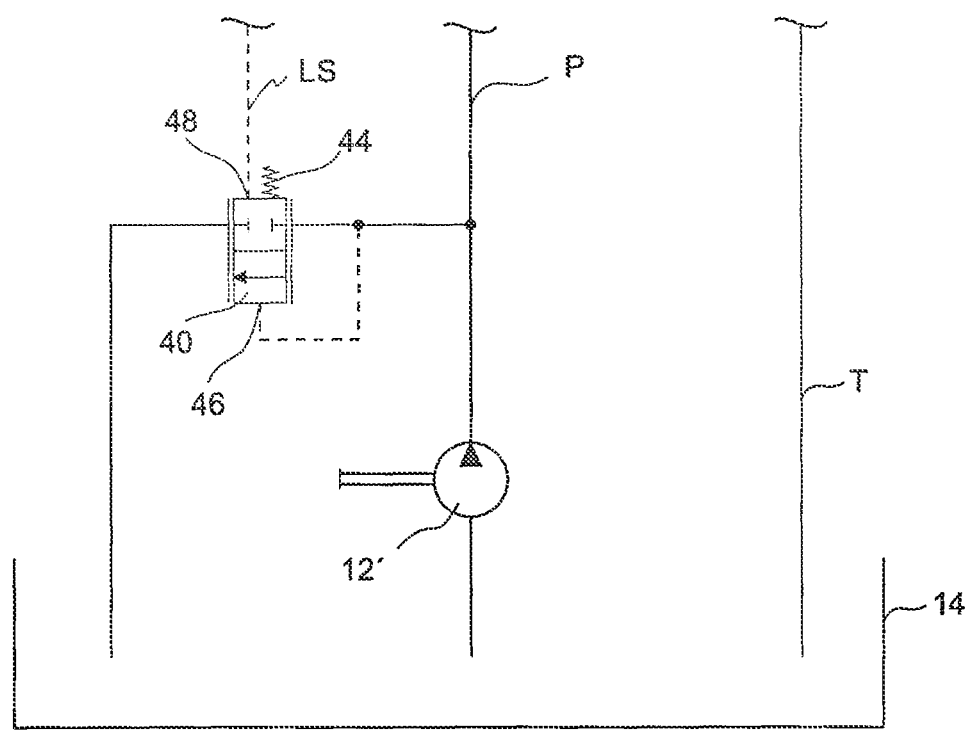
FIG. 2 illustrates part of a simplified OC-LS hydraulic circuit.

Various modifications to the systems and methods will be apparent to those skilled in the art, without departing from the scope of the disclosure. For example, the main pump MP may be a fixed displacement pump and the pump supply may be configured as illustrated in FIG. 2. In this case, the pump supply pressure PSP is regulated by directing a hydraulic LS pump supply control signal HPSCS having a pressure $P_{set}$ from a solenoid-controlled pressure limiting valve 54 to the load sensing port 48 of the proportional pressure compensator valve 40. The solenoid-controlled pressure limiting valve 54 being controlled by the electronic pump supply control signal EPCS from the tractor controller 102.

The invention claimed is:

1. A control system for controlling a hydraulic supply system on a mobile machine, wherein the hydraulic supply system includes a pump supply for supplying a pressurized fluid to a plurality of consumers carried by the mobile machine;

the control system comprising at least one controller configured to:
receive, from a pressure sensor of a load sensing system associated with at least one of the plurality of consumers, a pressure signal indicative of a sensed load sensing pressure (LSP) associated with the at least one of the consumers; and
be operative in a load sensing mode of control of the pump supply to compute and generate a control signal for regulating a pump supply pressure (PSP) provided by the pump supply in dependence on the sensed LSP;
wherein the at least one controller is configured to receive data relating to at least one parameter of the mobile machine and to determine from the data when at least one of the consumers is to be actuated;
be selectively operative in a predictive mode of control of the pump supply to compute and generate a control signal to adjust the pump supply following a determination that said at least one of the consumers is to be actuated; and
revert to the load sensing mode of control of the pump supply after a preselected time period following initiation of the predictive mode of control of the pump supply.

2. The control system of claim 1, wherein, in the predictive mode of operation, the at least one controller is configured to compute and generate a control signal to increase the PSP of the pump supply.

3. The control system of claim 2, wherein the at least one controller is configured in the predictive mode of operation to determine an expected hydraulic load demand of the at least one of the consumers, to determine a suitable PSP value to satisfy the determined expected hydraulic load demand, and to compute and generate a control signal to increase the PSP to the determined suitable value.

4. The control system of claim 1, wherein the at least one controller is configured to enter a predictive mode of control of the pump supply in respect of less than all of the consumers.

5. The control system of claim 1, wherein the at least one controller is configured to enter a predictive mode of control of the pump supply following a determination that a trigger event has occurred, the trigger event known to precede actuation of the at least one of the consumers.

6. The control system of claim 1, wherein the at least one controller is configured to receive data relating to at least one operative parameter of the mobile machine selected from the group consisting of:
at least one sensor on the mobile machine configured to detect an operational parameter of the mobile machine;
a control signal relating to actuation of at least one of the plurality of consumers carried by the mobile machine;
a control signal relating to actuation of an actuator on the mobile machine; and
at least one camera on the mobile machine.

7. The control system of claim 1, wherein the at least one controller is configured when operative in the load sensing mode of pump supply control to determine, from the received pressure signal indicative of a sensed LSP associated with the at least one consumer, a rate of change of the LSP; and to compute and generate a control signal for regulating the PSP provided by the pump supply in dependence on the determined rate of change of the LSP.

8. The control system of claim 1, wherein the at least one controller is configured when operative in the predictive mode of pump supply control to determine an operational response of the at least one of the consumers with reference to an operational target associated with the at least one of the consumers.

9. The control system of claim 8,
wherein the at least one controller is configured to:
store, in a memory accessible by the at least one controller, at least one predetermined value for the PSP selected to satisfy the hydraulic load demand of the at least one of the consumers in dependence on the determined operational response meeting the operational target; and
retrieve and apply the stored at least one predetermined value for the PSP during subsequent implementation of a predictive mode of pump supply control for the at least one of the consumers.

10. A mobile machine comprising:
a hydraulic supply system including a pump supply for supplying a pressurized fluid to a plurality of consumers on the mobile machine; and
the control system for controlling the hydraulic supply system of claim 1.

11. The control system of claim 1, wherein the at least one controller is configured to enter a predictive mode of control of the pump supply in response to an operational parameter being met.

12. A method of controlling a hydraulic supply system on a mobile machine, wherein the hydraulic supply system includes a pump supply for supplying a pressurized fluid to a plurality of consumers carried by the mobile machine, the hydraulic supply system comprising an electronic load sensing system operative to adjust a pump supply pressure (PSP) provided by the pump supply in dependence on a sensed load sensing pressure (LSP) associated with at least one of the consumers in a load sensing mode of control of the pump supply; the method comprising:
selectively controlling the pump supply in a predictive mode by adjusting the pump supply in response to a determination that the at least one of the consumers is due to be actuated; and
reverting to a load sensing mode of control of the pump supply after a preselected time period after the pump supply is adjusted in a predictive mode of control.

13. The method of claim 12, further comprising, in the predictive mode of control, adjusting the pump supply by increasing the PSP of the pump supply.

14. The method of claim 12, further comprising:
determining an expected hydraulic load demand of the at least one of the consumers;
determining a suitable PSP value to satisfy the determined expected hydraulic load demand; and
pre-emptively increasing the PSP to the determined suitable value.

15. The method of claim 12, further comprising using the electronic load sensing system to regulate the PSP in dependence on the rate of change of LSP when operating in the load sensing mode of control of the pump supply.

16. The method of claim 12, further comprising determining an operational response of the at least one consumer with reference to an operational target associated with the at least one consumer following adjustment of the pump supply in the predictive mode of control.

17. The method of claim 16, further comprising:
storing at least one predetermined value for the PSP selected to satisfy the hydraulic load demand of the at least one of the consumers in dependence on the determined operational response meeting the operational target; and retrieving and applying the stored at least one predetermined value for the PSP during subsequent implementation the predictive mode of control for the at least one of the consumers.

18. The method of claim 12, wherein the plurality of consumers comprises at least one selected from the group consisting of a consumer on the mobile machine and an implement attached to the mobile machine.

\* \* \* \* \*